(12) United States Patent
Yan et al.

(10) Patent No.: US 12,081,313 B2
(45) Date of Patent: Sep. 3, 2024

(54) SATELLITE LOCATION INFORMATION TRANSMISSION METHOD, APPARATUS, SYSTEM, AND STORAGE MEDIUM

(71) Applicant: HUAWEI TECHNOLOGIES CO., LTD., Shenzhen (CN)

(72) Inventors: Xueqiang Yan, Shanghai (CN); Rongdao Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 390 days.

(21) Appl. No.: 17/400,765

(22) Filed: Aug. 12, 2021

(65) Prior Publication Data

US 2021/0376917 A1  Dec. 2, 2021

Related U.S. Application Data

(63) Continuation of application No. PCT/CN2020/072830, filed on Jan. 17, 2020.

(30) Foreign Application Priority Data

Feb. 14, 2019  (CN) .......................... 201910114947.8

(51) Int. Cl.
*H04W 4/029* (2018.01)
*H04B 7/185* (2006.01)
*H04W 64/00* (2009.01)

(52) U.S. Cl.
CPC ........ *H04B 7/18519* (2013.01); *H04W 4/029* (2018.02); *H04W 64/003* (2013.01)

(58) Field of Classification Search
None
See application file for complete search history.

(56) References Cited

U.S. PATENT DOCUMENTS

| 2006/0077096 | A1 | 4/2006 | King et al. |
| 2008/0270026 | A1 | 10/2008 | Han |
| 2015/0270890 | A1* | 9/2015 | Vasavada ............... H04B 7/195 370/326 |
| 2017/0041830 | A1* | 2/2017 | Davis ................... H04B 7/1851 |
| 2019/0199431 | A1* | 6/2019 | Speidel .............. H04B 7/18532 |
| 2021/0376915 | A1* | 12/2021 | Mahalingam ....... H04W 72/542 |

(Continued)

FOREIGN PATENT DOCUMENTS

| CN | 101268630 A | 9/2008 |
| CN | 103220793 A | 7/2013 |
| CN | 103379435 A | 10/2013 |

(Continued)

*Primary Examiner* — Idowu O Osifade

(74) *Attorney, Agent, or Firm* — Rimon PC

(57) ABSTRACT

This application relates to the field of wireless communications technologies, and discloses a satellite location information transmission method, and related apparatus, system, and storage medium. The method includes: receiving satellite location information sent by at least one satellite base station, where the satellite location indicates a location of a satellite base station in a satellite orbit; determining a target satellite base station among the at least one satellite base station based on the received satellite location information; and initiating a random access process to the target satellite base station. The technical solutions provided in the embodiments of this application can reduce UE power consumption.

20 Claims, 7 Drawing Sheets

(56) References Cited

U.S. PATENT DOCUMENTS

2021/0385675 A1\* 12/2021 Määttänen ......... H04B 7/18539
2023/0216580 A1\* 7/2023 Qaise ................... H04W 84/06
370/326

FOREIGN PATENT DOCUMENTS

| CN | 103701517 A | 4/2014 |
| CN | 106558761 A | 4/2017 |
| CN | 108270477 A | 7/2018 |
| CN | 108696945 A | 10/2018 |
| CN | 108924946 A | 11/2018 |
| CN | 109104236 A | 12/2018 |

\* cited by examiner

SATELLITE LOCATION INFORMATION TRANSMISSION METHOD, APPARATUS, SYSTEM, AND STORAGE MEDIUM

CROSS-REFERENCE TO RELATED APPLICATIONS

This application is a continuation of International Patent Application No. PCT/CN2020/072830, filed on Jan. 17, 2020, which claims priority to Chinese Patent Application No. 201910114947.8, filed on Feb. 14, 2019. The disclosures of the aforementioned applications are hereby incorporated by reference in their entireties.

TECHNICAL FIELD

This application relates to the field of wireless communications technologies, and in particular, to a satellite location information transmission method, an apparatus, a system, and a storage medium.

BACKGROUND

Satellite communication is a technology in which an artificial earth satellite is used as a communications base station. In the satellite communications technology, the artificial earth satellite may also be referred to as a satellite base station. Compared with conventional wireless communications technology, the satellite communications technology has a wider coverage area and can overcome natural geographical obstacles such as oceans, deserts, and high mountains. Therefore, the satellite communications technology can be used as an effective supplement to the conventional wireless communications technology.

In the satellite communications technology, user equipment (UE) may access a satellite base station in the following manner: The UE calculates an elevation angle between the UE and each satellite base station, and determines a satellite base station that has a largest elevation angle, as a to-be-accessed satellite base station. Then, the UE initiates a random access process to the to-be-accessed satellite base station, to access the satellite base station.

However, in a related technology, the UE needs to perform a complex trigonometric function operation based on the latitude and longitude of the geographical location of the UE, to obtain the elevation angle between the UE and the satellite base station. Calculation complexity and operation load are relatively large. As a result, power consumption of the UE becomes relatively large.

SUMMARY

Embodiments of this application provide a satellite location information transmission method, an apparatus, a system, and a storage medium. The technical solutions are as follows.

According to a first aspect, a satellite location information transmission method is provided. The method is used in user equipment UE, and the method includes:

receiving satellite location information sent by at least one satellite base station, where satellite location information sent by a satellite base station in the at least one satellite base station is used to indicate a location that is of the satellite base station and that is in a satellite orbit to which the satellite base station belongs, and the satellite base station is any of the at least one satellite base station;

determining a target satellite base station among the at least one satellite base station based on the received satellite location information; and initiating a random access process to the target satellite base station.

In the satellite location information transmission method provided in some embodiments of this application, the UE may receive the satellite location information sent by the at least one satellite base station, where the satellite location information sent by the satellite base station in the at least one satellite base station is used to indicate the location that is of the satellite base station and that is in the satellite orbit to which the satellite base station belongs. Then, the UE may determine the target satellite base station in the at least one satellite base station based on the received satellite location information, and initiate the random access process to the target satellite base station. In this way, the UE does not need to calculate an elevation angle between the UE and the satellite base station, but can implement random access based on only the satellite location information sent by the satellite base station. Therefore, calculation complexity and operation load of the UE in the random access process can be reduced, so that the power consumption of the UE is reduced.

Optionally, the satellite location information sent by the satellite base station includes orbit information and satellite ranking information, where the orbit information is used to indicate the satellite orbit to which the satellite base station belongs, and the satellite ranking information is used to indicate a ranking that is of the satellite base station and that is in a satellite movement direction of the satellite orbit.

Optionally, a process of determining a target satellite base station in the at least one satellite base station based on the received satellite location information includes the following two cases:

case 1: when receiving satellite location information sent by only one satellite base station, determining the satellite base station that sends the satellite location information as the target satellite base station; or case 2: when receiving satellite location information sent by at least two satellite base stations, determining, in the at least two satellite base stations based on the received satellite location information, one satellite base station that satisfies a target condition, where the target condition includes at least one of a longest duration for covering the UE and a shortest data transmission delay with the UE; and determining the satellite base station that satisfies the target condition as the target satellite base station.

In the case 2, a process of determining, in the at least two satellite base stations based on the received satellite location information, one satellite base station that satisfies a target condition includes the following two subcases:

subcase 1: when satellite orbits indicated by orbit information in satellite location information sent by a plurality of satellite base stations in the at least two satellite base stations are the same, determining, in the m satellite base stations based on satellite ranking information in the satellite location information sent by the m satellite base stations, one satellite base station that satisfies the target condition, where m is an integer greater than 1; or subcase 2: when satellite orbits indicated by orbit information in the satellite location information sent by all of the at least two satellite base stations are different, determining, in the at least two satellite base stations based on the orbit information in the satellite location information sent by the at least two satellite base stations, one satellite base station that satisfies the target condition.

In the foregoing subcase 1, a process of determining, in the m satellite base stations based on satellite ranking information in the satellite location information sent by the m satellite base stations, one satellite base station that satisfies the target condition includes two implementation scenarios:

implementation scenario 1: when the target condition includes the longest duration for covering the UE, determining, as the satellite base station that satisfies the target condition, one satellite base station that is in the plurality of satellite base stations and that ranks low or lowest in a satellite movement direction of the satellite orbit to which the m satellite base stations belong; or implementation scenario 2: when the target condition includes the shortest data transmission delay with the UE, determining, as the satellite base station that satisfies the target condition, one satellite base station that is in the m satellite base stations and that ranks in the middle (explained later in the specification) in a satellite movement direction of the satellite orbit to which the m satellite base stations belong.

The orbit information is further used to indicate an altitude of the satellite orbit to which the satellite base station belongs. In the foregoing subcase 2, a process of the determining, in the at least two satellite base stations based on the orbit information in the satellite location information sent by the at least two satellite base stations, one satellite base station that satisfies the target condition includes two implementation scenarios:

implementation scenario 1: when the target condition includes the longest duration for covering the UE, determining, as the satellite base station that satisfies the target condition, one satellite base station that is in the at least two satellite base stations and whose satellite orbit has a higher altitude; or implementation scenario 2: when the target condition includes the shortest data transmission delay with the UE, determining, as the satellite base station that satisfies the target condition, one satellite base station that is in the at least two satellite base stations and whose satellite orbit has a lower altitude.

Optionally, the satellite base station is located in a polar constellation, and the satellite orbit to which the satellite base station belongs is a geostationary earth orbit (GEO), a medium earth orbit (MEO), or a low earth orbit (LEO).

Optionally, the receiving satellite location information sent by at least one satellite base station includes:

receiving the satellite location information broadcast by the at least one satellite base station. Certainly, the satellite location information sent by the at least one satellite base station in a unicast or multicast manner may alternatively be received.

According to a second aspect, a satellite location information transmission method is provided. The method is used in a satellite base station, and the method includes:

obtaining satellite location information of the satellite base station; and sending the satellite location information, where the satellite location information is used to indicate a location that is of the satellite base station and that is in a satellite orbit to which the satellite base station belongs.

Optionally, the satellite location information includes orbit information and satellite ranking information, the orbit information is used to indicate the satellite orbit to which the satellite base station belongs, and the satellite ranking information is used to indicate a ranking that is of the satellite base station and that is in a satellite movement direction of the satellite orbit.

Optionally, the orbit information is further used to indicate an altitude of the satellite orbit to which the satellite base station belongs.

Optionally, the satellite base station is located in a polar constellation, and the satellite orbit to which the satellite base station belongs is a geostationary earth orbit (GEO), a medium earth orbit (MEO), or a low earth orbit (LEO).

Optionally, the sending the satellite location information includes:

broadcasting the satellite location information.

Optionally, the satellite base station manages at least one other satellite base station, and the method further includes:

determining satellite location information of the at least one other satellite base station; and separately sending the determined satellite location information to the corresponding at least one other satellite base station.

In some embodiments of this application, the satellite base station manages the at least one other satellite base station, so that the flexibility of satellite base station management in a satellite communications system can be improved.

Optionally, the method further includes: after the at least one other satellite base station managed by the satellite base station changes, updating the satellite location information of the at least one other satellite base station managed by the satellite base station.

In some embodiments of this application, the satellite location information of the at least one other satellite base station is updated, so that the satellite location information in the satellite communications system can be updated in time, and the flexibility of satellite location information management in the satellite communications system is improved.

Optionally, the determining satellite location information of the at least one other satellite base station includes:

obtaining the satellite location information that is of the at least one other satellite base station and that is pre-recorded in the satellite base station; or determining satellite location information of each of the at least one other satellite base station based on a location relationship between each of the at least one other satellite base station and the satellite base station.

Optionally, the satellite base station and the at least one other satellite base station belong to the same satellite orbit.

According to a third aspect, a satellite location information transmission apparatus is provided. The apparatus includes at least one module, and the at least one module is configured to implement the satellite location information transmission method provided in any one of the first aspect or the optional implementations of the first aspect.

According to a fourth aspect, a satellite location information transmission apparatus is provided. The apparatus includes at least one module, and the at least one module is configured to implement the satellite location information transmission method provided in any one of the second aspect or the optional implementations of the second aspect.

According to a fifth aspect, a communications apparatus is provided. The communications apparatus includes a processor and a memory, and the memory stores an instruction; and the processor is configured to execute the instruction stored in the memory, and the processor executes the instruction to implement the satellite location information transmission method provided in any one of the first aspect or the optional implementations of the first aspect.

According to a sixth aspect, a communications apparatus is provided. The communications apparatus includes a processor and a memory, and the memory stores an instruction; and the processor is configured to execute the instruction stored in the memory, and the processor executes the instruction to implement the satellite location information transmission method provided in any one of the second aspect or the optional implementations of the second aspect.

According to a seventh aspect, a wireless communications system is provided. The wireless communications system includes:

the satellite location information transmission apparatus according to the third aspect and the satellite location information transmission apparatus according to the fourth aspect; or the communications apparatus according to the fifth aspect and the communications apparatus according to the sixth aspect.

According to an eighth aspect, a computer-readable storage medium is provided. The computer-readable storage medium stores an instruction. When the instruction is run on a processor, the processor is enabled to perform the satellite location information transmission method provided in any one of the first aspect or the optional implementations of the first aspect, or the processor is enabled to perform the satellite location information transmission method provided in any one of the second aspect or the optional implementations of the second aspect.

According to a ninth aspect, a computer program product is provided. The computer program product stores an instruction. When the computer program product runs on a computer, the computer is enabled to perform the satellite location information transmission method provided in the embodiments of this application.

According to a tenth aspect, a chip is provided. The chip includes a programmable logic circuit and/or a program instruction. When the chip runs, the satellite location information transmission method provided in the embodiments of this application can be performed.

The technical solutions provided in the embodiments of this application bring at least the following beneficial effects:

The satellite location information sent by the at least one satellite base station is received, where the satellite location information sent by the satellite base station in the at least one satellite base station is used to indicate the location that is of the satellite base station and that is in the satellite orbit to which the satellite base station belongs. Then, the target satellite base station is determined in the at least one satellite base station based on the received satellite location information, and the random access process is initiated to the target satellite base station. In this way, the UE does not need to calculate the elevation angle between the UE and the satellite base station, and can implement random access based on only the satellite location information sent by the satellite base station. Therefore, the calculation complexity and the operation amount in the UE's random access process can be reduced, and so is the power consumption of the UE.

DESCRIPTION OF EMBODIMENTS

To make the objectives, technical solutions, and advantages of this application clearer, the following further describes the implementations of this application in detail with reference to the accompanying drawings.

A satellite communications technology can overcome natural geographical obstacles such as oceans, deserts, and high mountains. Currently, because of this advantage, the satellite communications technology gradually becomes an effective supplement to the conventional wireless communications technology.

In the satellite communications technology, user equipment (UE) may access a satellite base station in the following manner: When the UE is located in signal coverage areas of at least two satellite base stations, the UE calculates an elevation angle between the UE and each of the at least two satellite base stations based on the latitude and longitude of a geographical location of the UE, where the elevation angle between the UE and the satellite base station is an included angle between the ground and a connection line between the UE and the satellite base station. Then, the UE determines, as a to-be-accessed satellite base station, a satellite base station that is in the at least two satellite base stations and that has a largest elevation angle. Then, the UE initiates a random access process to the satellite base station, to attempt to access the satellite base station.

Figure 1:
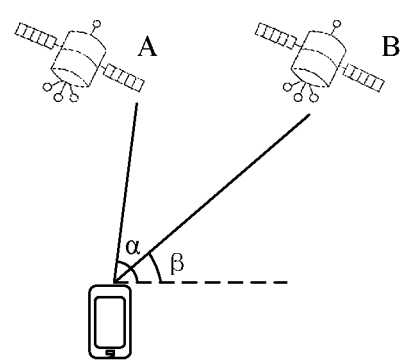
FIG. 1 is a schematic diagram of determining a to-be-accessed satellite base station according to an embodiment of this application.

As shown in FIG. 1, the UE is located in the signal coverage areas of a satellite base station A and a satellite base station B. In this case, in a process of accessing the satellite base station, the UE may separately calculate an elevation angle between the UE and the satellite base station A and an elevation angle between the UE and the satellite base station B based on the latitude and the longitude of the geographical location of the UE. As shown in FIG. 1, the elevation angle between the UE and the satellite base station A is a, and the elevation angle between the UE and the satellite base station B is β. Because a is greater than β, the UE may determine the satellite base station A as the to-be-accessed satellite base station, and initiate the random access process to the satellite base station A, to attempt to access the satellite base station A.

However, in the foregoing manner in which the UE accesses the satellite base station, the UE not only needs to obtain the latitude and the longitude of the geographical location of the UE, but also needs to perform a complex trigonometric function operation based on the latitude and the longitude, to obtain the elevation angle between the UE and the satellite base station. The calculation complexity and operation amount of the UE are relatively large. As a result, the power consumption of the UE is relatively large.

Embodiments of this application provide a satellite location information transmission method, an apparatus, a system, and a storage medium, to reduce power consumption of the UE.

In the satellite location information transmission method provided in the embodiments of this application, the UE may receive satellite location information sent by at least one satellite base station, where the satellite location information sent by a satellite base station in the at least one satellite base station is used to indicate a location that is of the satellite base station and that is in a satellite orbit to which the satellite base station belongs, and the satellite base station is any of the at least one satellite base station. Then, the UE may determine a target satellite base station in the at least one satellite base station based on the received satellite location information, and initiate a random access process to the target satellite base station. In this way, the UE does not need to calculate the elevation angle between the UE and the satellite base station, but can implement random access based on only the satellite location information sent by the satellite base station. Therefore, the calculation complexity and operation amount of the UE in the random access process can be reduced, so that the power consumption of the UE can be reduced.

Figure 2:
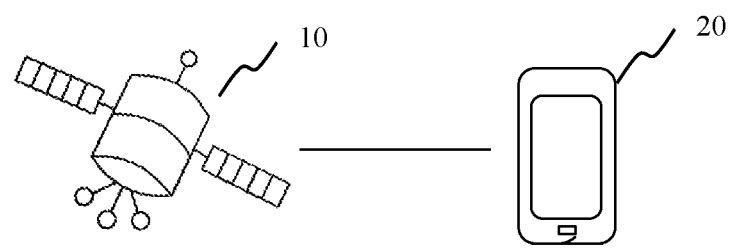
FIG. 2 is a schematic diagram of an implementation environment according to an embodiment of this application.

FIG. 2 is a schematic diagram of an implementation environment of a satellite location information transmission method according to an embodiment of this application. As shown in FIG. 2, the implementation environment may include a satellite base station 10 and at least one UE 20. The satellite base station 10 and the UE 20 may be connected through a wireless communications network, and the UE 20 may be any UE in a signal coverage area of the satellite base station 10.

The wireless communications network may be a fifth generation mobile communication technology (5G) communications network, may be a long term evolution (LTE) communications network, or may be another wireless communications network similar to the LTE communications network or the 5G communications network.

In an embodiment of this application, the satellite base station 10 may be located in a polar constellation. The polar constellation is a sky area of a constellation including a plurality of orbits passing the south pole and the north pole of the earth. Therefore, a satellite orbit to which the satellite base station 10 belongs also passes the south pole and the north pole of the earth. It should be noted that the satellite base station 10 may alternatively be located in another constellation. The location of the satellite base station 10 is not limited in this embodiment of this application.

In an embodiment of this application, the satellite orbit to which the satellite base station 10 belongs may be a geostationary earth orbit (GEO), a medium earth orbit (MEO), or a low earth orbit (LEO). Satellite base stations whose satellite orbits are a GEO, a MEO, and a LEO are respectively referred to as a GEO satellite base station, an MEO satellite base station, and an LEO satellite base station. The GEO satellite base station is usually also referred to as a geostationary orbit satellite, an orbit altitude of the GEO satellite base station is 35,786 km, and the satellite base station is static relative to the ground and provides a large coverage area. An orbit altitude of the MEO satellite base station ranges from 2,000 km to 35,786 km, and the global coverage can be implemented through a relatively small quantity of MEO satellite base stations. However, a transmission delay of the MEO satellite base station is higher than that of the LEO satellite base station. The MEO satellite base station is mainly used for positioning and navigation. An orbit altitude of the LEO satellite base station ranges from 300 km to 2,000 km. The LEO satellite base station has a lower orbit altitude, a shorter data transmission delay, a smaller power loss, and lower launching costs than the MEO satellite base station and the GEO satellite base station.

Figure 3:
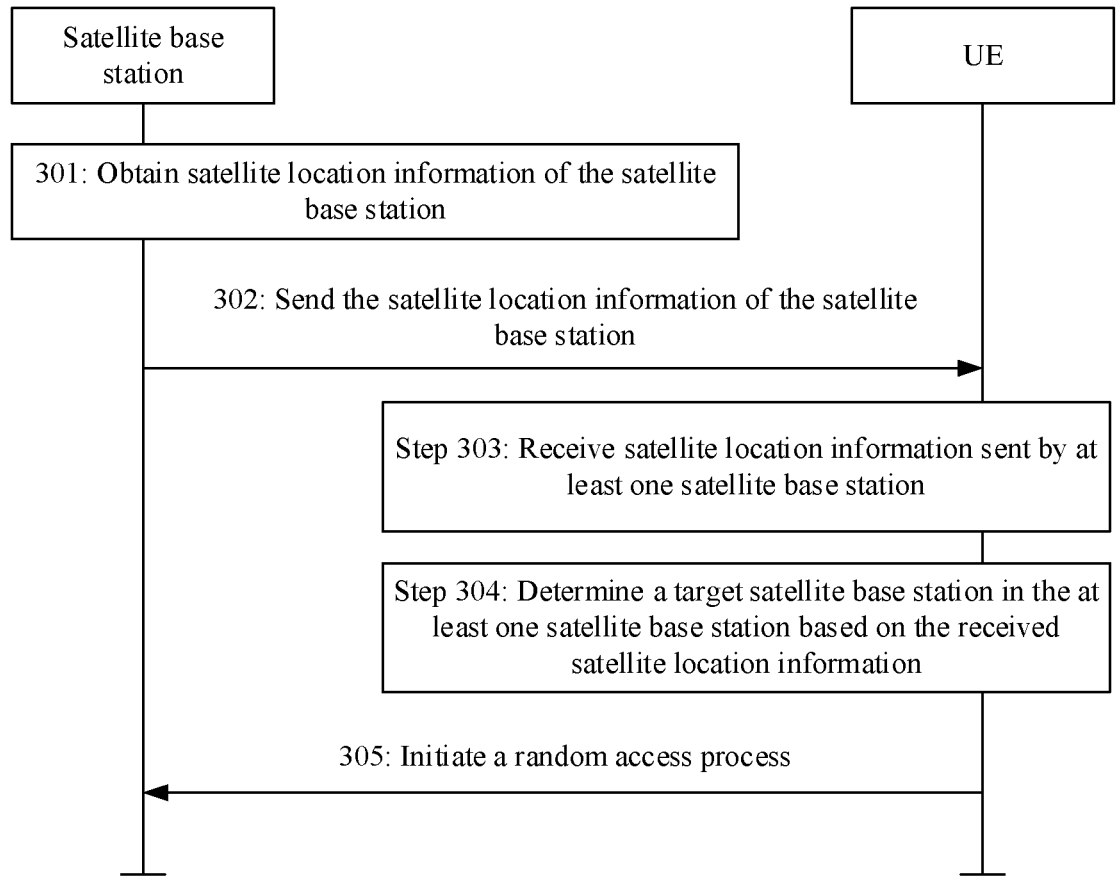
FIG. 3 is a flowchart of a satellite location information transmission method according to an embodiment of this application.

FIG. 3 is a flowchart of a satellite location information transmission method according to an embodiment of this application. The satellite location information transmission method may be used in the implementation environment shown in FIG. 2. As shown in FIG. 3, the satellite location information transmission method may include the following steps.

Step 301: A satellite base station obtains satellite location information of the satellite base station.

In this embodiment of this application, satellite location information may be configured for each satellite base station in a satellite communications system. The satellite communications system is a wireless communications system in which communication is performed by using a satellite communications technology, and the satellite communications system may include a plurality of satellite base stations and a plurality of UEs. The satellite communications system may allocate the satellite location information to the satellite base station in a plurality of manners. In this embodiment of this application, the following three possible implementations are used as examples for description.

In a first possible implementation, after the satellite base station is launched into a satellite orbit, in other words, after the satellite base station lifts off, a ground device (also referred to as a ground station) may send the satellite location information to the satellite base station. After receiving the satellite location information sent by the ground device, the satellite base station may store the satellite location information in a first storage location in the satellite base station. In this way, configuration of the satellite location information is completed. In step 301, the satellite base station may obtain the satellite location information from the first storage location. It should be noted that the ground device may send the satellite location information to each satellite base station directly or through forwarding performed by a satellite base station.

In a second possible implementation, before the satellite base station is launched into a satellite orbit, in other words, before the satellite base station lifts off, the satellite location information may be written into a second storage location in the satellite base station. After the satellite location information is written, the satellite base station may be launched into the satellite orbit. In this way, configuration of the satellite location information is completed. In step 301, the satellite base station may obtain the satellite location information from the second storage location.

In a third possible implementation, there is at least one satellite base station used for satellite management in the satellite communications system. The satellite base station used for satellite management manages at least one other satellite base station. The satellite base station used for satellite management may be a preset satellite base station, or may be elected by a plurality of satellite base stations in the satellite communications system after the plurality of satellite base stations are launched into a satellite orbit, in other words, after the plurality of satellite base stations lift off. Assuming that the satellite base station used for satellite management is a first satellite base station, the first satellite base station may determine satellite location information of the at least one other satellite base station managed by the first satellite base station, and separately send the determined satellite location information to the corresponding at least one other satellite base station. The first satellite base station may determine the satellite location information of the at least one other satellite base station in a plurality of manners. For example, the first satellite base station obtains the satellite location information that is pre-recorded in the satellite base station and that is of the at least one other satellite base station (where the satellite location information of the at least one other satellite base station may be pre-recorded in the first satellite base station by using the foregoing first possible implementation or second possible implementation). Alternatively, the first satellite base station determines satellite location information of each of the at least one other satellite base station based on a location relationship between the satellite base station and each of the at least one other satellite base station. It should be noted that satellite location information of the first satellite base station may be determined by using the foregoing first possible implementation or second possible implementation. Because the first satellite base station may determine the satellite location information of the first satellite base station, and further obtain the location relationship between the satellite base station and each of the at least one other satellite base station, the first satellite base station may obtain the satellite location information of each of the at least one other satellite base station through calculation based on the location information of the first satellite base station and the obtained location relationship.

It should be noted that the first satellite base station may send the satellite location information to each of the at least one other satellite base station directly or through forwarding performed by a satellite base station.

Optionally, the first satellite base station and the at least one other satellite base station managed by the first satellite base station belong to a same satellite orbit, so that the first satellite base station can conveniently manage the at least one other satellite base station, and communication costs are reduced.

It should be noted that the first satellite base station may further perform other data transmission with the at least one other satellite base station, to manage the at least one other satellite base station. Details are not described in this embodiment of this application.

In some embodiments of this application, the satellite location information of a satellite base station in the satellite communications system is used to indicate a location that is of the satellite base station and that is in a satellite orbit to which the satellite base station belongs, where the satellite base station may be any satellite base station in the satellite communications system.

Optionally, the satellite location information of the satellite base station may include orbit information and satellite ranking information. The orbit information is used to indicate the satellite orbit to which the satellite base station belongs, and the satellite ranking information is used to indicate a ranking that is of the satellite base station and that is in a satellite movement direction of the satellite orbit. The "satellite movement direction of the satellite orbit" is a movement direction of the satellite base station in the satellite orbit. Usually, movement directions of all satellite base stations in a same satellite orbit are the same. For example, satellite movement directions of satellite orbits that pass the south pole and the north pole of the earth are the same, and all point from the north pole of the earth to the south pole of the earth. It should be noted that, that a plurality of satellite base stations belong to a same satellite orbit means that an orbit spacing between satellite orbits to which any two satellite base stations in the plurality of satellite base stations belong is less than or equal to a specified orbit spacing threshold, and the change rules of satellite orbits to which the plurality of satellite base stations belong are the same or similar, that is, the orbits coincide or approximately coincide. The satellite base stations belonging to the same satellite orbit are usually referred to as co-orbital satellites, and the orbit information of the co-orbital satellites is usually the same.

Figure 4:
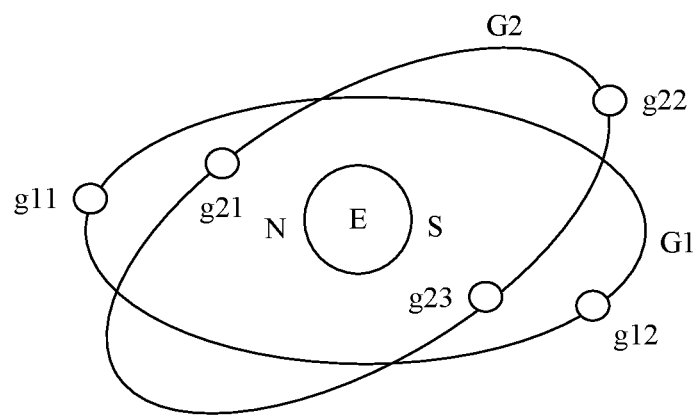
FIG. 4 is a schematic diagram of satellite orbits according to an embodiment of this application.

FIG. 4 shows two satellite orbits: a satellite orbit G1 and a satellite orbit G2. Both the satellite orbit G1 and the satellite orbit G2 pass the south pole S and the north pole N of the earth E, and the satellite movement directions of both the satellite orbit G1 and the satellite orbit G2 point from the north pole N of the earth E to the south pole S of the earth E. There are two satellite base stations in the satellite orbit G1: a satellite base station g11 and a satellite base station g12. In other words, the two satellite base stations are co-orbital satellites. There are three satellite base stations in the satellite orbit G2: a satellite base station g21, a satellite base station g22, and a satellite base station g23. In other words, the three satellite base stations are co-orbital satellites. Satellite location information is configured for each satellite base station in FIG. 4. The satellite base station g22 is used as an example. Satellite location information of the satellite base station g22 may include orbit information and satellite ranking information. The orbit information of the satellite base station g22 is used to indicate the satellite orbit G2, and the satellite ranking information of the satellite base station g22 is used to indicate a ranking that is of the satellite base station g22 and that is in the direction pointing from the north pole N of the earth E to the south pole S of the earth E.

In an embodiment of this application, the satellite communications system may allocate an orbit number to each satellite orbit (for the allocation process, refer to the foregoing three possible implementations). For example, the satellite communications system may allocate an orbit number to the satellite orbit G1, and the orbit number may be 1. The satellite communications system may also allocate an orbit number to the satellite orbit G2, and the orbit number may be 2. In this case, the orbit information in the satellite location information may be the orbit number. In the foregoing example, the orbit information in the satellite location information of the satellite base station g22 may be the orbit number of the satellite orbit G2, that is, the orbit information in the satellite location information of the satellite base station g22 may be 2.

In an embodiment of this application, the satellite communications system may allocate a base station number to each satellite base station (for the allocation process, refer to the foregoing three possible implementations). In this case, the satellite ranking information in the satellite location information may be the base station number of the satellite base station. Base station numbers of a plurality of satellite base stations in a same satellite orbit may gradually increase or decrease in a satellite movement direction of the satellite orbit. In this way, the value of the base station number of the satellite base station may indicate a ranking that is of the satellite base station and that is in the satellite movement direction of the satellite orbit.

In the foregoing example, the base station numbers of the satellite base station g21, the satellite base station g22, and the satellite base station g23 in the satellite orbit G2 may be p21, p22, and p23 respectively, and the satellite movement direction of the satellite orbit G2 points from the north pole N of the earth E to the south pole S of the earth E. In this direction, the base station numbers of the satellite base stations may gradually increase or decrease, that is, p21, p22, and p23 may gradually increase or decrease.

It should be noted that the satellite communications system allocates a different orbit number to each satellite orbit, and the orbit numbers in the satellite location information of co-orbital satellites are the same. In a same satellite orbit, the satellite communications system allocates a different base station number to each satellite base station in the satellite orbit. In other words, one orbit number may uniquely indicate one satellite orbit. In a same satellite orbit, one base station number may uniquely indicate one satellite base station. The combination of an orbit number and a base station number may uniquely indicate one satellite base station in the satellite communications system.

Figure 5:
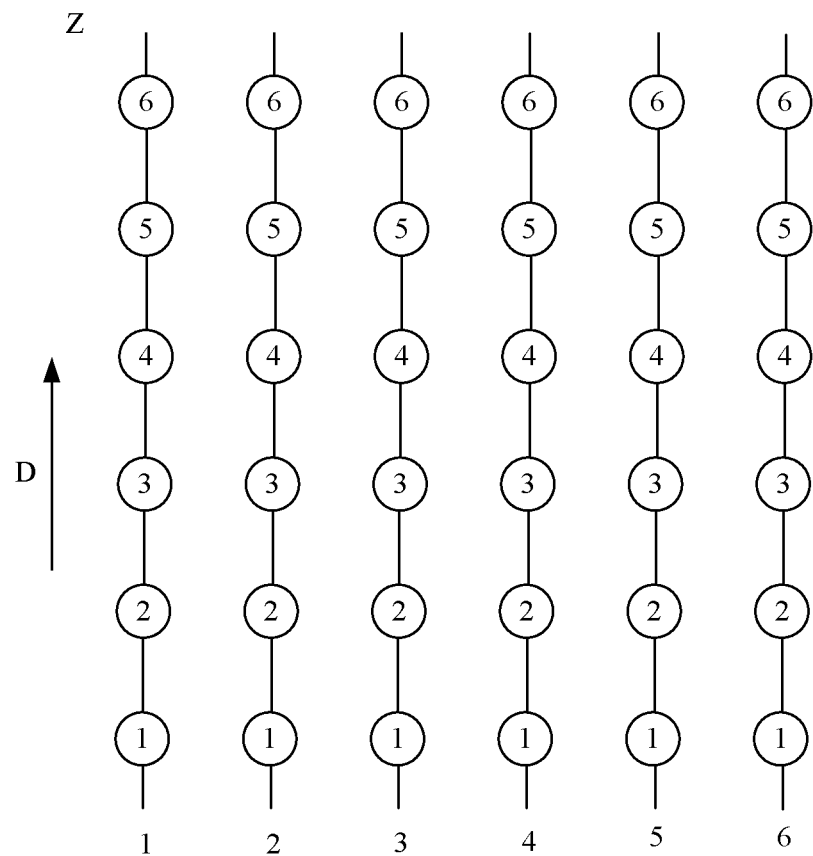
FIG. 5 is a schematic diagram of a polar constellation according to an embodiment of this application.

FIG. 5 is a schematic diagram of a polar constellation Z. The polar constellation Z includes six satellite orbits, and six satellite base stations run in each satellite orbit. In addition, satellite movement directions of the six satellite orbits are all in a direction D shown in FIG. 5 (namely, a bottom-up direction in FIG. 5). The satellite communications system may allocate an orbit number to each of the six satellite orbits, and allocated orbit numbers may be 1, 2, 3, 4, 5, and 6. In addition, the satellite communications system may allocate a base station number to each satellite base station in each satellite orbit, and the allocated base station numbers may be 1, 2, 3, 4, 5, and 6. The allocated base station numbers increase in the direction D. In this case, a satellite orbit with the orbit number 1 in the polar constellation Z is used as an example, and the satellite location information of the satellite base stations in the satellite orbit may be 11, 12, 13, 14, 15, and 16, where the former digit indicates an orbit number, and the latter digit indicates a base station number. It should be noted that, the foregoing expression manner of the satellite location information is directly combining the orbit information and the satellite ranking information according to a preset sequence. The satellite location information may alternatively be expressed in another manner. For example, for a piece of satellite location information, after the orbit information and satellite ranking information are sorted according to the preset sequence, a specified separator is added between the orbit information and the satellite ranking information. The specified separator may be a comma, a semicolon, a slash, or the like. To help the UE distinguish each piece of received satellite location information, the piece of satellite location information may further include another added identifier in addition to the orbit information and the satellite ranking information, where the identifier is used to identify the satellite location information. For example, the identifier is brackets or square brackets. For example, the satellite orbit with the orbit number 1 in the polar constellation Z is used as an example, and the satellite location information of the satellite base stations in the satellite orbit may be (1, 1), (1, 2), (1, 3), (1, 4), (1, 5), and (1, 6), where the separator is the comma, the identifier is the brackets, the first element in the brackets indicates orbit information, namely, an orbit number, and the second element in the brackets indicates satellite ranking information, namely, a base station number.

It should be noted that, in this embodiment of this application, the orbit information and the satellite ranking information in the satellite location information may be indicated by using independent fields, or may be indicated by using different bits in a same field.

In an embodiment of this application, orbit information in satellite location information of any satellite base station is used to indicate a satellite orbit to which the satellite base station belongs, and may be further used to indicate an altitude of the satellite orbit to which the satellite base station belongs. The altitude refers to a distance from the satellite base station to the ground, that is, a vertical altitude.

Optionally, the orbit information may include orbit identification information and orbit altitude information. The orbit identification information is used to indicate the satellite orbit to which the satellite base station belongs, the orbit altitude information is used to indicate the altitude of the satellite orbit to which the satellite base station belongs, and the orbit identification information may be the orbit number described above.

It should be noted that, after the satellite base stations in the satellite communications system change, the satellite communications system may update corresponding satellite location information. The changes of the satellite base stations in the satellite communications system may include: a change of the satellite base stations caused by an increase (for example, a new satellite base station is launched) or a decrease (for example, if a satellite base station is faulty and temporarily stops operating, the satellite base station may be considered as an invalid satellite base station; or a satellite base station is recycled) in a quantity of the satellite base stations; or a change of the satellite base stations caused by a change of satellite location information (for example, the change of the satellite location information caused by a change of a generation rule of the orbit information and/or the satellite ranking information). These changes generally cause a change of satellite location information of one or more satellite base stations.

With reference to the foregoing first possible implementation, after the satellite base stations in the satellite communications system change, when satellite location information of a satellite base station changes, the ground device may send updated satellite location information to the satellite base station.

With reference to the foregoing third possible implementation, after the at least one other satellite base station managed by the first satellite base station changes, the first satellite base station may further update the satellite location information of the at least one other satellite base station managed by the satellite base station. For example, when satellite location information of another satellite base station managed by the first satellite base station changes, the first satellite base station may send updated satellite location information to the other satellite base station.

It should be noted that some or all functions of the first satellite base station may be performed by the foregoing ground device. Details are not described in this embodiment of this application.

Step 302: The satellite base station sends the satellite location information of the satellite base station to UE.

After obtaining the satellite location information of the satellite base station, the satellite base station may add a cyclic redundancy check (CRC) code to the end of the satellite location information, and perform channel coding on the satellite location information to which the CRC code is added, to obtain encoded satellite location information. The channel coding may be polar coding, convolutional coding, Turbo coding, low-density parity-check coding, or the like. Then, the satellite base station may modulate the encoded satellite location information, to obtain modulated satellite location information. A modulation scheme used by the satellite base station may be a quadrature phase shift keying (QPSK) scheme. After obtaining the modulated satellite location information, the satellite base station may map the modulated satellite location information to a time domain resource for transmission. Optionally, the satellite base station may map the modulated satellite location information to consecutive time domain resources for transmission, or may map the modulated satellite location information to discrete time domain resources for transmission.

In an embodiment of this application, the satellite base station may send the satellite location information of the satellite base station to the UE by sending the modulated satellite location information in a unicast or multicast manner. For example, the satellite base station may map the modulated satellite location information to a time domain resource on a physical downlink control channel (PDCCH) for transmission.

In another embodiment of this application, the satellite base station may map the modulated satellite location information to a time domain resource on a broadcast channel for transmission. In other words, the satellite base station may send the satellite location information of the satellite base station to the UE in a broadcast manner. Sending the satellite location information of the satellite base station to the UE in a broadcast manner can improve information sending efficiency of the satellite base station, and reduce data processing costs of the satellite base station.

Step 303: The UE receives satellite location information sent by the at least one satellite base station.

Figure 6:
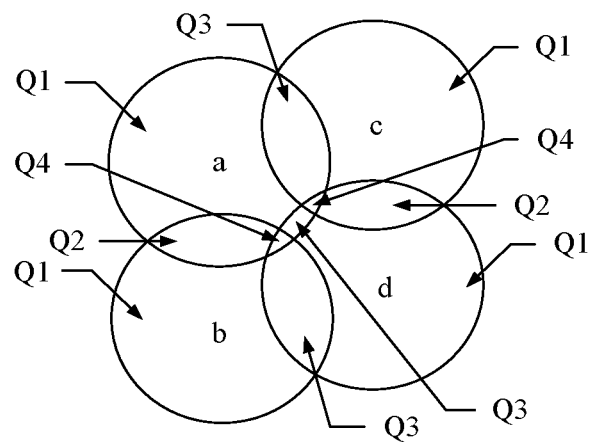
FIG. 6 is a schematic diagram of signal coverage areas of satellite base stations according to an embodiment of this application.

FIG. 6 is a schematic diagram of the signal coverage areas of satellite base stations. Each circular area in FIG. 6 represents a signal coverage area of one satellite base station. The circular area a is a signal coverage area of a satellite base station A, the circular area b is a signal coverage area of a satellite base station B, the circular area c is a signal coverage area of a satellite base station C, and the circular area d is a signal coverage area of a satellite base station D. The satellite base station A and the satellite base station B belong to a same satellite orbit, and the satellite base station C and the satellite base station D belong to a same satellite orbit. As shown in FIG. 6, when the UE is located in an area Q1 in FIG. 6, the UE is located in a signal coverage area of one satellite base station; when the UE is located in an area Q2 or Q3 in FIG. 6, the UE is located in the signal coverage areas of two satellite base stations; or when the UE is located in an area Q4 in FIG. 6, the UE is located in signal coverage areas of three satellite base stations.

It can be learned from FIG. 6 that the UE may be at least located in the signal coverage area of one satellite base station, or may be located in the signal coverage areas of a plurality of (for example, three) satellite base stations.

Because the satellite base station can send the satellite location information to only UEs in the signal coverage area of the satellite base station, with reference to content shown in FIG. 6, it can be learned that in step 303, the UE may receive at least satellite location information sent by one satellite base station (e.g., if the UE is located in the area Q1 in FIG. 6), or may receive satellite location information sent by a plurality of (for example, three) satellite base stations (e.g., if the UE is located in the area Q4 in FIG. 6).

In an embodiment of this application, the UE may receive the satellite location information sent by the at least one satellite base station to the UE in a unicast or multicast manner. For example, the satellite base station may receive, on a time domain resource on a PDCCH, the satellite location information sent by the at least one satellite base station.

In another embodiment of this application, the UE may receive, on a time domain resource on a broadcast channel, the satellite location information sent by the at least one satellite base station. In other words, the UE may receive the satellite location information broadcast by the at least one satellite base station.

The satellite location information received by the UE is satellite location information on which the satellite base station has performed channel coding and modulation. Therefore, after receiving the satellite location information sent by the satellite base station, the UE needs to perform demodulation and decoding processing on the received satellite location information, to obtain the satellite location information on which channel coding and modulation are not performed.

Step 304: The UE determines a target satellite base station in the at least one satellite base station based on the received satellite location information.

As described above, the UE may receive at least the satellite location information sent by one satellite base station, or may receive the satellite location information sent by a plurality of satellite base stations. Therefore, a process in which the UE determines the target satellite base station includes the following two cases:

In a case 1, when the UE receives the satellite location information sent by only one satellite base station, it indicates that the UE is located in a signal coverage area of one satellite base station. FIG. 6 is used as an example. When the UE is located in the area Q1 in FIG. 6, the UE can access only the satellite base station c that sends the satellite location information. In this case, the UE may determine, as a to-be-accessed satellite base station, the satellite base station c that sends the satellite location information, in other words, determine the satellite base station as the target satellite base station.

In a case 2, when the UE receives the satellite location information sent by at least two satellite base stations, it indicates that the UE is located in the signal coverage areas of the at least two satellite base stations. FIG. 6 is used as an example. When the UE may be located in the area Q2, Q3, or Q4 in FIG. 6, the UE may determine, in the at least two satellite base stations, a satellite base station as a to-be-accessed satellite base station, in other words, use the satellite base station as the target satellite base station.

For example, the UE may determine, in the at least two satellite base stations based on the received satellite location information, one satellite base station that satisfies a target condition. The process may include the following two subcases:

In a subcase 1, when satellite orbits indicated by orbit information in satellite location information sent by m satellite base stations in the at least two satellite base stations are the same, the UE determines, in the m satellite base stations based on satellite ranking information in the satellite location information sent by the m satellite base stations, one satellite base station that satisfies the target condition, where m is an integer greater than 1, that is, m≥2.

In a subcase 2, when satellite orbits indicated by orbit information in the satellite location information sent by all of the at least two satellite base stations are different, the UE determines, in the at least two satellite base stations based on the orbit information in the satellite location information sent by the at least two satellite base stations, one satellite base station that satisfies the target condition.

In the foregoing two subcases, there may be a plurality of target conditions. For example, the target condition may include at least one of a longest duration for covering the UE and a shortest data transmission delay with the UE. Principles of the two conditions are as follows:

Generally, GEO satellite base stations are static relative to the ground. After the UE (on the ground) accesses a GEO satellite base station, if the UE is moving fast (for example, the UE is on a train or a high-speed train), the satellite base station moves relative to the UE. In a process in which the satellite base station moves relative to the UE, a signal coverage area of the satellite base station also moves relative to the UE. In this subcase, after the UE accesses a satellite base station, the UE gradually leaves a signal coverage area of the satellite base station. When the UE is located at a boundary of the coverage area of the satellite base station, the UE needs to perform a cell handover.

Generally, MEO or LEO satellite base stations are not static relative to the ground. Therefore, after the UE (on the ground) accesses an MEO or LEO satellite base station, the satellite base station moves relative to the UE. In a process in which the satellite base station moves relative to the UE, a signal coverage area of the satellite base station also moves relative to the UE. Therefore, after the UE accesses a satellite base station, the UE gradually leaves a signal coverage area of the satellite base station. When the UE is located at a boundary of the coverage area of the satellite base station, the UE needs to perform a cell handover.

To reduce the frequency of performing the cell handover by the UE, and reduce a negative impact on the satellite communications system caused by frequent cell handovers of the UE, when the UE is located in the signal coverage areas of at least two satellite base stations, the UE may select, as the target satellite base station, a satellite base station with a longest duration for covering the UE.

The duration in which the satellite base station covers the UE is a duration in which the UE can be located in the signal coverage area of the satellite base station after the UE accesses the satellite base station.

Figure 7:
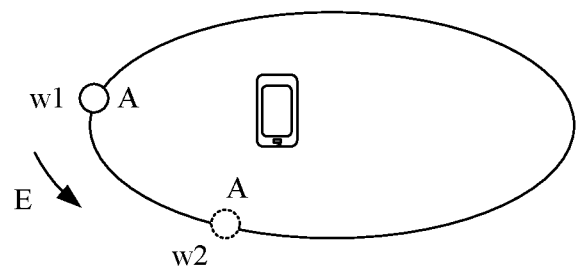
FIG. 7 is a schematic diagram of movement of a satellite base station according to an embodiment of this application.

Referring to FIG. 7, when a satellite base station A is accessed, the satellite base station A is located at a location W1, and a movement direction of the satellite base station A relative to the UE is a direction E shown in FIG. 7 (to be specific, the UE moves in a direction opposite to the direction E and/or the satellite base station A moves in the direction E). When the satellite base station A moves relative to the UE from the location W1 to a location W2 shown by a dashed circle in FIG. 7, the UE just leaves a signal coverage area of the satellite base station A. In this case, the duration in which the satellite base station A covers the UE is equal to the duration required by the satellite base station A to move from W1 to W2. For ease of description, in the following embodiments, an example in which the satellite base station moves to generate relative movement between the satellite base station and the UE is used for description. During an actual implementation, alternatively, the UE may move, or both the satellite base station and the UE move, to generate the relative movement between the satellite base station and the UE. Details are not described in the embodiments of this application again.

Generally, the data transmission delay between the satellite base station and the UE is positively correlated with a distance between the satellite base station and the UE. In other words, a longer distance between the satellite base station and the UE indicates a longer data transmission delay between the satellite base station and the UE, and a shorter distance between the satellite base station and the UE indicates a shorter data transmission delay between the satellite base station and the UE.

In addition, the distance between the satellite base station and the UE is positively correlated with an altitude of a satellite orbit to which the satellite base station belongs. In other words, a higher satellite orbit to which the satellite base station belongs indicates a longer distance between the satellite base station and the UE, and a lower satellite orbit to which the satellite base station belongs indicates a shorter distance between the satellite base station and the UE.

Because a relatively short transmission delay may bring relatively good user experience, the UE may select, as the target satellite base station, a satellite base station with the shortest data transmission delay with the UE.

In this embodiment of this application, a process of determining the target satellite base station is described with reference to the foregoing two subcases and the target condition.

In the foregoing first subcase, in a first implementation scenario, when the target condition includes the longest duration for covering the UE, the UE determines, as the satellite base station that satisfies the target condition, one satellite base station that is in the m satellite base stations and that ranks low in a satellite movement direction of the satellite orbit to which the m satellite base stations belong.

It should be noted that the satellite base station ranking low in the satellite movement direction refers to a non-frontmost satellite base station.

In an optional implementation, a satellite base station that is in the m satellite base stations and that ranks last in the satellite movement direction of the satellite orbit to which the m satellite base stations belong may be determined as the satellite base station that satisfies the target condition.

Figure 8:
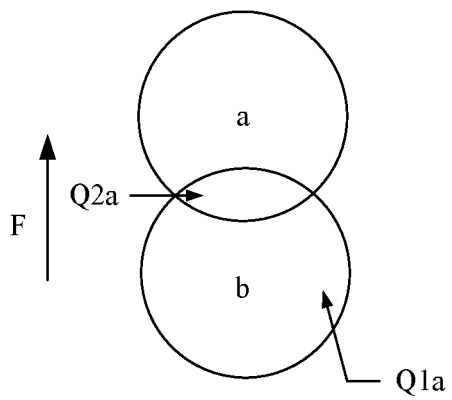
FIG. 8 is a schematic diagram of signal coverage areas of satellite base stations according to an embodiment of this application.

For example, referring to FIG. 8, it is assumed that the m satellite base stations include a satellite base station A and a satellite base station B. The UE is located in an area Q2a, the area Q2a is an overlapping area of the signal coverage area a of the satellite base station A and the signal coverage area b of the satellite base station B, the satellite base station A and the satellite base station B belong to a same satellite orbit, and a satellite movement direction of the satellite orbit is a direction F, namely, a bottom-up direction in FIG. 8. As shown in FIG. 8, in the direction F, the satellite base station A ranks higher, and the satellite base station B ranks lower. In other words, in the direction F, the satellite base station A is located in front of the satellite base station B. As the satellite base station A and the satellite base station B move, the UE gradually leaves the area Q2a and enters an area Q1a. In other words, as the satellite base station A and the satellite base station B move, the UE gradually moves from the signal coverage area of the satellite base station A to the signal coverage area of the satellite base station B. Therefore, compared with the satellite base station A, the satellite base station B has a longer duration for covering the UE. Therefore, the satellite base station B may be selected as the target satellite base station.

Generally, the sizes of the signal coverage areas of co-orbital satellites are the same. However, during actual implementation, because of functions, sizes of signal coverage areas of some satellite base stations may be different from a size of a signal coverage area of a co-orbital satellite of the satellite base stations. FIG. 8 is described by using an example in which the sizes of the signal coverage areas of the satellite base station A and the satellite base station B that belong to the same satellite orbit are the same. A size of a signal coverage area of each satellite base station is not limited in this application.

For example, referring to FIG. 6, when the UE receives satellite location information sent by three satellite base stations, it indicates that the UE is located in the area Q4 shown in FIG. 6. It is assumed that the UE may determine two co-orbital satellite base stations in the three satellite base stations. Satellite orbits indicated by the orbit information in the satellite location information sent by the two co-orbital satellite base stations are the same. In other words, the two co-orbital satellite base stations belong to a same satellite orbit. The UE determines, in the two co-orbital satellite base stations based on the satellite ranking information in the satellite location information sent by the two co-orbital satellite base stations, a satellite base station that ranks last in a satellite movement direction of the satellite orbit to which the two co-orbital satellite base stations belong; and determines the satellite base station that ranks last as the satellite base station with the longest duration for covering the UE in the three satellite base stations, that is, the target satellite base station.

Figure 9:
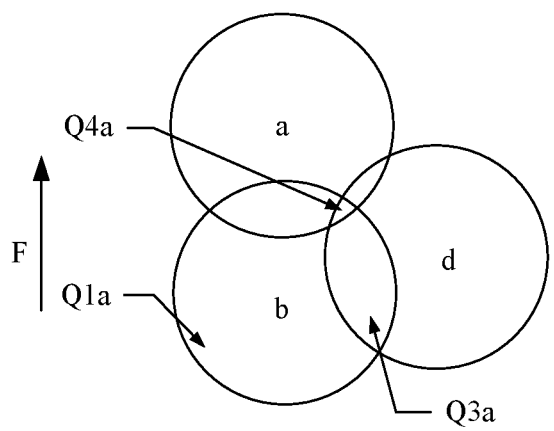
FIG. 9 is a schematic diagram of signal coverage areas of satellite base stations according to an embodiment of this application.

As shown in FIG. 9, the UE is located in an area Q4a, and the area Q4a is an overlapping area of a signal coverage area a of a satellite base station A, a signal coverage area b of a satellite base station B, and a signal coverage area d of a satellite base station D. The satellite base station A and the satellite base station B belong to a same satellite orbit, and the satellite base station D belongs to another satellite orbit. Therefore, the satellite base station A and the satellite base station B are co-orbital satellite base stations. In other words, the m satellite base stations include the satellite base station A and the satellite base station B. As shown in FIG. 9, in a satellite movement direction F, the satellite base station A ranks first, the satellite base station B ranks last, and the satellite base station D ranks in the middle. As the satellite base station A, the satellite base station B, and the satellite base station D move, the UE gradually leaves the area Q4a and enters an area Q3a, and then gradually leaves the area Q3a and enters an area Q1a. The area Q3a is an overlapping area of the signal coverage area of the satellite base station B and the signal coverage area of the satellite base station D, and the area Q1a is the signal coverage area of the satellite base station B. Therefore, compared with the satellite base station A and the satellite base station D, the satellite base station B has a longer duration for covering the UE, and the satellite base station B is a satellite base station that ranks lower in the direction F in the co-orbital satellite base stations A and B.

Optionally, if the satellite ranking information is the base station number of the satellite base station, and the base station numbers of the m satellite base stations (namely, the m satellite base stations that are in the at least two satellite base stations and whose satellite orbits indicated by the orbit information in the satellite location information are the same) in the same satellite orbit gradually increase in the satellite movement direction of the satellite orbit, the UE may determine a satellite base station with a smallest base station number in the m satellite base stations as the satellite base station that ranks last in the satellite movement direction of the satellite orbit to which the m satellite base stations belong. The satellite orbit with the orbit number 1 in FIG. 5 is used as an example. It is assumed that the UE is located in the signal coverage areas of two satellite base stations with base station numbers 2 and 3. In other words, the m satellite base stations are two satellite base stations with orbit numbers 1 and base station numbers 2 and 3. In this case, the satellite base station with the base station number 2 is the target satellite base station. Optionally, if the satellite ranking information is the base station number of the satellite base station, and base station numbers of the m satellite base stations in the same satellite orbit gradually decrease in the satellite movement direction of the satellite orbit, the UE may determine a satellite base station with a largest base station number in the m satellite base stations as the satellite base station that ranks last in the satellite movement direction of the satellite orbit to which the m satellite base stations belong.

In another optional implementation, weighting processing may be performed on rankings of the m satellite base stations in the satellite movement direction of the satellite orbit to which the m satellite base stations belong, to obtain access priorities of the m satellite base stations, and a satellite base station with a highest access priority is determined as the satellite base station that satisfies the target condition. In a process of the weighting processing, a weighted value of each of the m satellite base stations may be determined based on a quality of experience (QoE) parameter of the satellite base station. For example, the QoE parameter may include at least one of signal quality, signal strength, and quality of service (QoS). Optionally, if the satellite ranking information is the base station number of the satellite base stations, and the base station numbers of the m satellite base stations in the same satellite orbit gradually increase in the satellite movement direction of the satellite orbit, the UE may multiply a base station number of each of the m satellite base stations by the weighted value of the satellite base station, to obtain a first access index of the satellite base station, where the first access index is negatively correlated with the access priority. The UE determines a satellite base station with a determined smallest access index as the satellite base station with the highest access priority, that is, the target satellite base station. Optionally, if the satellite ranking information is the base station number of the satellite base stations, and the base station numbers of the m satellite base stations in the same satellite orbit gradually decrease in the satellite movement direction of the satellite orbit, the UE may multiply a base station number of each of them satellite base stations by the weighted value of the satellite base station, to obtain a second access index of the satellite base station, where the second access index is positively correlated with the access priority, and the access index is usually equal to the access priority. The UE determines a satellite base station with a determined largest access index as the satellite base station with the highest access priority, that is, the target satellite base station.

In the foregoing first subcase, in a second implementation scenario, when the target condition includes the shortest data transmission delay with the UE, a satellite base station that is in the m satellite base stations and that ranks in the middle in the satellite movement direction of the satellite orbit to which the m satellite base stations belong is determined as the satellite base station that satisfies the target condition.

It should be noted that, when m is an even number, the satellite base station ranking in the middle in the satellite movement direction is an $(m/2)^{th}$ satellite base station or an (m/2+1)$^{th}$ satellite base station in the m satellite base stations. For example, m=2. In this case, the satellite base station ranking in the middle in the satellite movement direction is the first base station or the second base station in the m satellite base stations. When m is an odd number, the satellite base station ranking in the middle in the satellite movement direction is an ⌈m/2⌉$^{th}$ satellite base station in them satellite base stations, where "⌈⌉" represents rounding up. For example, m=3. In this case, the satellite base station ranking in the middle in the satellite movement direction is the second base station in the m satellite base stations.

As described above, the data transmission delay between the satellite base station and the UE is positively correlated with the distance between the satellite base station and the UE. In the satellite movement direction of the same satellite orbit, the satellite base station ranking in the middle is usually located right above the UE, and has a shorter distance with the UE than other satellite base stations. Therefore, the satellite base station ranking in the middle is determined as the target satellite base station, to ensure the shortest data transmission delay between the determined target satellite base station and the UE.

For example, still referring to FIG. 8, it is assumed that the m satellite base stations include the satellite base station A and the satellite base station B, that is, m=2. In the direction F, the satellite base station A ranks higher, and the satellite base station B ranks lower. In other words, in the direction F, the satellite base station A is located in front of the satellite base station B. Because the satellite base station A and the satellite base station B belong to a same satellite orbit, and the two satellite base stations are both satellite base stations ranking in the middle. Therefore, one of the two satellite base stations may be selected as the target satellite base station. The selection process may be random selection, or may refer to another selection rule, for example, refer to the selection rule in the foregoing first implementation scenario.

In the second subcase, in a first implementation scenario, when the target condition includes the longest duration for covering the UE, a satellite base station that is in the at least two satellite base stations and whose satellite orbit has a higher altitude is determined as the satellite base station that satisfies the target condition.

As described above, orbit information in satellite location information of any satellite base station may be further used to indicate an altitude of a satellite orbit to which the satellite base station belongs. In this case, the UE may determine, based on the obtained orbit information, the satellite base station that is in the at least two satellite base stations and whose satellite orbit has the higher altitude, as the satellite base station that satisfies the target condition.

It should be noted that the satellite base station that is in the at least two satellite base stations and whose satellite orbit has the higher altitude is a satellite base station that is not the lowest.

In an optional implementation, a satellite base station that is in the at least two satellite base stations and whose satellite orbit has a highest altitude may be determined as the satellite base station that satisfies the target condition.

In another optional implementation, weighting processing may be performed on the altitudes of the at least two satellite base stations, to obtain the access priorities of the at least two satellite base stations, and a satellite base station with the highest access priority is determined as the satellite base station that satisfies the target condition. In a weighting processing, a weighted value of each of the at least two satellite base stations may be determined based on a QoE parameter of the satellite base station. For example, the QoE parameter may include at least one of signal quality, signal strength, and QoS. Optionally, the UE may multiply an altitude of each of the at least two satellite base stations by the weighted value of the satellite base station, to obtain a third access index of the satellite base station, where the third access index is positively correlated with the access priority, for example, the third access index is equal to the access priority. The UE determines a satellite base station with a determined largest access index as the satellite base station with the highest access priority, that is, the target satellite base station.

In the second subcase, in a second implementation scenario, when the target condition includes the shortest data transmission delay with the UE, a satellite base station that is in the at least two satellite base stations and whose satellite orbit has a lower altitude is determined as the satellite base station that satisfies the target condition.

Similarly, in this case, the UE may determine, based on the obtained orbit information, the satellite base station that is in the at least two satellite base stations and whose satellite orbit has the lower altitude, as the satellite base station that satisfies the target condition.

It should be noted that the satellite base station that is in the at least two satellite base stations and whose satellite orbit has the lower altitude is a satellite base station that is not the highest.

In an optional implementation, a satellite base station that is in the at least two satellite base stations and whose satellite orbit has a lowest altitude may be determined as the satellite base station that satisfies the target condition.

FIG. 6 is still used as an example. When the satellite orbits indicated by the orbit information in the satellite location information sent by all of the at least two satellite base stations are different, it indicates that the UE is located in the area Q3 shown in FIG. 6. In this case, the UE may determine, in the at least two satellite base stations based on the orbit information in the satellite location information sent by the at least two satellite base stations, a satellite base station whose satellite orbit has a lower altitude, and determine the satellite base station whose satellite orbit has the lower altitude, as the satellite base station that satisfies the target condition.

In another optional implementation, weighting processing may be performed on altitudes of the at least two satellite base stations, to obtain access priorities of the at least two satellite base stations, and a satellite base station with an obtained highest access priority is determined as the satellite base station that satisfies the target condition. In a process of the weighting processing, a weighted value of each of the at least two satellite base stations may be determined based on a QoE parameter of the satellite base station. For example, the QoE parameter may include at least one of signal quality, signal strength, and QoS. Optionally, the UE may multiply an altitude of each of the at least two satellite base stations by the weighted value of the satellite base station, to obtain a fourth access index of the satellite base station, where the fourth access index is negatively correlated with the access priority. The UE determines a satellite base station with the smallest access index as the satellite base station with the highest access priority, that is, the target satellite base station.

It should be noted that, in the foregoing first subcase, when the satellite orbits indicated by the orbit information in the satellite location information sent by the m satellite base stations in the at least two satellite base stations are the same, one satellite base station that satisfies the target condition is preferentially determined in the m satellite base stations.

Because the m satellite base stations are co-orbital satellites, when the UE performs an action such as base station handover, operation costs are relatively low, and network overheads are relatively low.

During actual implementation of this embodiment of this application, when there is a satellite base station other than the m satellite base stations in the at least two satellite base stations, the target satellite base station may be determined in the at least two satellite base stations in another manner. In an optional example, an action performed in the first subcase may be replaced with the following: When the target condition includes the longest duration for covering the UE, a candidate satellite base station whose satellite orbit has a higher altitude is determined among the at least two satellite base stations. If there is one candidate satellite base station, the candidate satellite base station is determined as the target satellite base station. For this process, refer to the first implementation scenario in the second subcase. When the candidate satellite base station includes the foregoing m satellite base stations (where the m satellite base stations are co-orbital satellites and have a same altitude), if the target condition includes only the longest duration for covering the UE, one satellite base station that is in the m satellite base stations and that ranks low in the satellite movement direction of the satellite orbit to which the m satellite base stations belong may be determined as the target satellite base station. For this process, refer to the first implementation scenario in the foregoing first subcase. If the target condition further includes the shortest data transmission delay with the UE, one satellite base station that is in the m satellite base stations and that ranks in the middle in the satellite movement direction of the satellite orbit to which the m satellite base stations belong is determined as the target satellite base station. For this process, refer to the second implementation scenario in the first subcase.

In another optional example, the action performed in the first subcase may be replaced with the following: When the target condition includes the shortest data transmission delay with the UE, a candidate satellite base station whose satellite orbit has a lower altitude is determined in the at least two satellite base stations. If there is one candidate satellite base station, the candidate satellite base station is determined as the target satellite base station. For this process, refer to the second implementation scenario in the foregoing second subcase. When the candidate satellite base station includes the foregoing m satellite base stations (where the m satellite base stations are co-orbital satellites and have a same altitude), if the target condition further includes the longest duration for covering the UE, one satellite base station that is in the m satellite base stations and that ranks low in the satellite movement direction of the satellite orbit to which the m satellite base stations belong may be determined as the target satellite base station. For this process, refer to the first implementation scenario in the foregoing first subcase. If the target condition includes only the shortest data transmission delay with the UE, one satellite base station that is in the m satellite base stations and that ranks in the middle in the satellite movement direction of the satellite orbit to which the m satellite base stations belong is determined as the target satellite base station. For this process, refer to the second implementation scenario in the first subcase.

Further, it should be noted that, in a current satellite communications system, one UE is usually located in the signal coverage areas of at most three satellite base stations. Therefore, there is usually only one group of co-orbital satellite base stations, and the quantity m of the satellite base stations in the group of satellite base stations is 2 or 3.

With development of the satellite communications technologies, one UE may alternatively be located in the signal coverage areas of at least four satellite base stations. In this case, the at least two satellite base stations may include at least two groups of satellite base stations, and each group of satellite base stations includes a plurality of satellite base stations. Satellite orbits indicated by orbit information in satellite location information sent by the satellite base stations in each group of satellite base stations are the same, and the satellite orbit may be referred to as a satellite orbit corresponding to the group of satellite base stations. In addition, satellite orbits indicated by orbit information in satellite location information sent by satellite base stations in different groups of satellite base stations are different. In this case, a target group of satellite base stations may be first selected from the at least two groups of satellite base stations, where satellite base stations included in the target group of satellite base stations are the foregoing m satellite base stations. Then, the action in the foregoing first subcase is performed. Because satellite orbits corresponding to the at least two groups of satellite base stations are different from each other, for a process of selecting one target group of satellite base stations in the at least two groups of satellite base stations, refer to the process of determining, in the at least two satellite base stations, one satellite base station that satisfies the target condition in the foregoing second subcase. To be specific, when the target condition includes the longest duration for covering the UE, a group of satellite base stations that is in the at least two groups of satellite base stations and whose corresponding satellite orbit has a higher altitude is determined as the target group of satellite base stations; or when the target condition includes the shortest data transmission delay with the UE, a group of satellite base stations that is in the at least two groups of satellite base stations and whose corresponding satellite orbit has a lower altitude is determined as the target group of satellite base stations. Details are not described herein again in this embodiment of this application.

It should be noted that there may be a plurality of actual execution processes of step 304. For example, in a first implementation, after receiving the satellite location information, the UE may first determine a quantity of pieces of satellite location information received from different satellite base stations. When the quantity is 1, it indicates that the UE receives satellite location information sent by only one satellite base station, the UE performs the action in the foregoing first case. When the quantity is greater than 1, the UE receives satellite location information sent by at least two satellite base stations, and the UE performs the action in the foregoing second case.

There may also be a plurality of processes of implementing the action in the foregoing second case. In an optional manner, when receiving the satellite location information sent by the at least two satellite base stations, the UE may detect whether there are satellite base stations belonging to a same satellite orbit in the at least two satellite base stations. When there are satellite base stations belonging to a same satellite orbit in the at least two satellite base stations, the action in the foregoing first subcase is performed. When there are not satellite base stations belonging to a same satellite orbit in the at least two satellite base stations, the action in the foregoing second subcase is performed.

Step 305: The UE initiates a random access process to the target satellite base station.

The UE may send a random access preamble to the target satellite base station, to initiate the random access process to the target satellite base station, so as to attempt to access the target satellite base station.

In conclusion, according to the satellite location information transmission method provided in this embodiment of this application, the satellite location information sent by the at least one satellite base station is received, where the satellite location information sent by the satellite base station in the at least one satellite base station is used to indicate the location that is of the satellite base station and that is in the satellite orbit to which the satellite base station belongs. Then, the target satellite base station is determined in the at least one satellite base station based on the received satellite location information, and the random access process is initiated to the target satellite base station. In this way, the UE does not need to calculate the elevation angle between the UE and the satellite base station, but can implement random access based on only the satellite location information sent by the satellite base station. Therefore, the calculation complexity and the workload of the UE in the random access process can be reduced, so that the power consumption of the UE is reduced.

Figure 10:
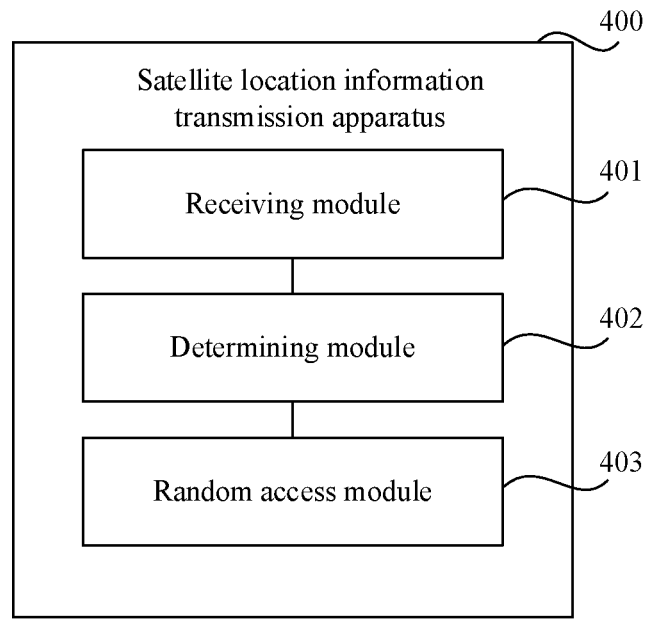
FIG. 10 is a schematic diagram of a satellite location information transmission apparatus according to an embodiment of this application.

FIG. 10 is a block diagram of a satellite location information transmission apparatus 400 according to an embodiment of this application. The satellite location information transmission apparatus 400 may be the UE in the implementation environment shown in FIG. 2. Referring to FIG. 10, the satellite location information transmission apparatus 400 may include a receiving module 401, a determining module 402, and a random access module 403.

The receiving module 401 is configured to receive satellite location information sent by at least one satellite base station, where the satellite location information sent by a satellite base station in the at least one satellite base station is used to indicate a location that is of the satellite base station and that is in a satellite orbit to which the satellite base station belongs, and the satellite base station is any of the at least one satellite base station.

The determining module 402 is configured to determine a target satellite base station in the at least one satellite base station based on the received satellite location information.

The random access module 403 is configured to initiate a random access process to the target satellite base station.

In an embodiment of this application, the satellite location information sent by the satellite base station includes orbit information and satellite ranking information, the orbit information is used to indicate the satellite orbit to which the satellite base station belongs, and the satellite ranking information is used to indicate a ranking that is of the satellite base station and that is in a satellite movement direction of the satellite orbit.

In an embodiment of this application, the determining module 402 includes:

a first determining submodule, configured to: when satellite location information sent by only one satellite base station is received, determine the satellite base station that sends the satellite location information as the target satellite base station.

In an embodiment of this application, the determining module 402 includes:

a second determining submodule, configured to: when the satellite location information sent by at least two satellite base stations is received, determine, in the at least two satellite base stations based on the received satellite location information, one satellite base station that satisfies a target condition, where the target condition includes at least one of a longest duration for covering the UE and a shortest data transmission delay with the UE, where the second determining submodule is further configured to determine the satellite base station that satisfies the target condition as the target satellite base station.

In an embodiment of this application, the second determining submodule is configured to:

when the satellite orbits indicated by orbit information in satellite location information sent by a plurality of satellite base stations in the at least two satellite base stations are the same, determine, in the m satellite base stations based on satellite ranking information in the satellite location information sent by the m satellite base stations, one satellite base station that satisfies the target condition as the target satellite base station, where m is an integer greater than 1; or when the satellite orbits indicated by orbit information in the satellite location information sent by all of the at least two satellite base stations are different, determine, in the at least two satellite base stations based on the orbit information in the satellite location information sent by the at least two satellite base stations, one satellite base station that satisfies the target condition as the target satellite base station.

In an embodiment of this application, the second determining submodule is configured to:

when the target condition includes the longest duration for covering the UE, determine, as the satellite base station that satisfies the target condition, one satellite base station that is in the plurality of satellite base stations and that ranks low in a satellite movement direction of the satellite orbit to which the m satellite base stations belong; or when the target condition includes the shortest data transmission delay with the UE, determine, as the satellite base station that satisfies the target condition, one satellite base station that is in the m satellite base stations and that ranks in the middle in a satellite movement direction of the satellite orbit to which the m satellite base stations belong.

In an embodiment of this application, the orbit information is further used to indicate an altitude of the satellite orbit to which the satellite base station belongs; and the second determining submodule is configured to:

when the target condition includes the longest duration for covering the UE, determine, as the satellite base station that satisfies the target condition, one satellite base station that is in the at least two satellite base stations and whose satellite orbit has a higher altitude; or when the target condition includes the shortest data transmission delay with the UE, determine, as the satellite base station that satisfies the target condition, one satellite base station that is in the at least two satellite base stations and whose satellite orbit has a lower altitude.

In an embodiment of this application, the satellite base station is located in a polar constellation, and the satellite orbit to which the satellite base station belongs is a geostationary earth orbit (GEO), a medium earth orbit (MEO), or a low earth orbit (LEO).

In an embodiment of this application, the receiving module is configured to:

receive the satellite location information broadcast by the at least one satellite base station.

In conclusion, the satellite location information transmission apparatus provided in this embodiment of this application receives the satellite location information sent by the at least one satellite base station, where the satellite location information sent by the satellite base station in the at least one satellite base station is used to indicate the location that is of the satellite base station and that is in the satellite orbit to which the satellite base station belongs. Then, the satellite location information transmission apparatus determines the target satellite base station in the at least one satellite base station based on the received satellite location information, and initiates the random access process to the target satellite base station. In this way, the UE does not need to calculate an elevation angle between the UE and the satellite base station, but can implement random access based on only the satellite location information sent by the satellite base station. Therefore, the calculation complexity and operation amount of the UE in the random access process can be reduced, so that the power consumption of the UE is reduced.

A specific manner of performing an operation by each module in the apparatus in the foregoing embodiment is described in detail in the embodiment related to the method, and details are not described herein.

Figure 11:
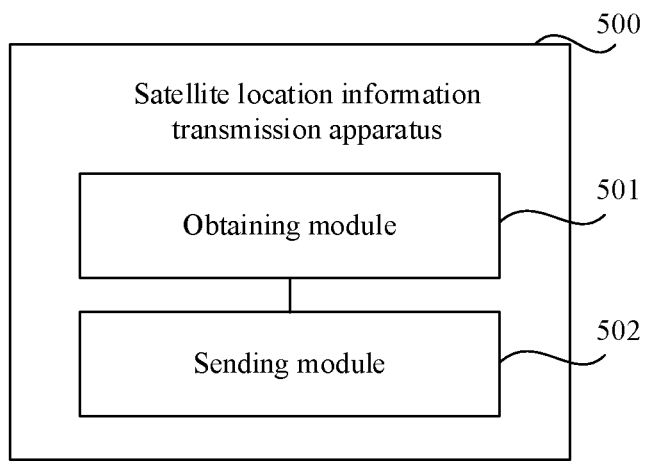
FIG. 11 is a schematic diagram of a satellite location information transmission apparatus according to an embodiment of this application.

FIG. 11 is a block diagram of a satellite location information transmission apparatus 500 according to an embodiment of this application. The satellite location information transmission apparatus 500 may be the satellite base station in the implementation environment shown in FIG. 2. Referring to FIG. 11, the satellite location information transmission apparatus 500 may include an obtaining module 501 and a sending module 502.

The obtaining module 501 is configured to obtain satellite location information of the satellite base station.

The sending module 502 is configured to send the satellite location information.

The satellite location information is used to indicate a location that is of the satellite base station and that is in a satellite orbit to which the satellite base station belongs.

In an embodiment of this application, the satellite location information includes orbit information and satellite ranking information, the orbit information is used to indicate the satellite orbit to which the satellite base station belongs, and the satellite ranking information is used to indicate a ranking that is of the satellite base station and that is in a satellite movement direction of the satellite orbit.

In an embodiment of this application, the orbit information is further used to indicate an altitude of the satellite orbit to which the satellite base station belongs.

In an embodiment of this application, the satellite base station is located in a polar constellation, and the satellite orbit to which the satellite base station belongs is a geostationary earth orbit (GEO), a medium earth orbit (MEO), or a low earth orbit (LEO).

In an embodiment of this application, the sending module 502 is configured to broadcast the satellite location information.

In an embodiment of this application, the satellite base station manages at least one other satellite base station, and the apparatus further includes:

a determining module, configured to determine satellite location information of the at least one other satellite base station; and a second sending module, configured to separately send the determined satellite location information to the corresponding at least one other satellite base station.

In an embodiment of this application, the apparatus further includes:

an updating module, configured to: after the at least one other satellite base station managed by the satellite base station changes, update the satellite location information of the at least one other satellite base station managed by the satellite base station.

In an embodiment of this application, the determining module is configured to:

obtain the satellite location information that is of the at least one other satellite base station and that is pre-recorded in the satellite base station; or determine satellite location information of each of the at least one other satellite base station based on a location relationship between each of the at least one other satellite base station and the satellite base station.

In an embodiment of this application, the satellite base station and the at least one other satellite base station belong to the same satellite orbit.

In conclusion, the satellite location information transmission apparatus provided in this embodiment of this application sends the satellite location information to the UE, where the satellite location information is used to indicate the location that is of the satellite base station and that is in the satellite orbit to which the satellite base station belongs, so that UE determines a target satellite base station in at least one satellite base station based on the received satellite location information, and initiates a random access process to the target satellite base station. In this way, the UE does not need to calculate an elevation angle between the UE and the satellite base station, but can implement random access based on only the satellite location information sent by the satellite base station. Therefore, the calculation complexity and the operation amount of the UE in the random access process can be reduced, so that power consumption of the UE is reduced.

A specific manner of performing an operation by each module in the apparatus in the foregoing embodiment is described in detail in the embodiment related to the method, and details are not described herein.

An embodiment provides a communications apparatus. The communications apparatus may be UE (which may also be referred to as a terminal), or may be a structure such as a circuit structure, a chip, or a chip system in UE. An embodiment provides a terminal 600. The terminal 600 may be the foregoing communications apparatus, and the terminal 600 may be configured to perform a technical process performed by the UE in the satellite location information transmission method provided in the foregoing embodiment.

The terminal 600 may include components such as an RF (radio frequency) circuit 610, a memory 620 including one or more computer-readable storage media, an input unit 630, a display unit 640, a sensor 650, an audio circuit 660, a Wi-Fi (wireless fidelity) module 670, a processor 680 including one or more processing cores, and a power supply 612. It should be noted that in some possible implementations, the memory 620 and the processor 680 may be integrated together. It may be understood by a person skilled in the art that, the terminal structure shown in FIG. 12 does not constitute any limitation on the terminal, and the terminal may include more or fewer components than those shown in the figure, or combine some components, or have different component arrangements.

The RF circuit 610 may be configured to: receive and send signals in an information receiving or sending process or a call process. Particularly, after receiving downlink information of a base station, the RF circuit 610 delivers the downlink information to one or more processors 680 for processing. In addition, the RF circuit 610 sends related uplink data to the base station. Usually, the RF circuit 610 includes but is not limited to an antenna, at least one amplifier, a tuner, one or more oscillators, a subscriber identity module (SIM) card, a transceiver, a coupler, an LNA (low noise amplifier), and a duplexer. In addition, the RF circuit 610 may further communicate with a network and another device through wireless communication. Any communications standard or protocol may be used for the wireless communication, including but not limited to GSM (global system for mobile communications), GPRS (general packet radio service), CDMA (code division multiple access), WCDMA (wideband code division multiple access), LTE (long term evolution), email, SMS (short message service), and the like.

The memory 620 may be configured to store a software program and a module. The processor 680 runs the software program and the module stored in the memory 620, to perform various function applications and data processing. The memory 620 may include a program storage area and a data storage area. The program storage area may store an operating system, an application program required for at least one function (for example, a sound play function and an image play function), and the like. The data storage area may store data (for example, audio data and an address book) created based on use of the terminal 600, and the like. In addition, the memory 620 may include a high speed random access memory, and may further include a nonvolatile memory such as at least one magnetic disk storage component, a flash memory, or another volatile solid-state storage component. Correspondingly, the memory 620 may further include a memory controller, to provide access to the memory 620 for the processor 680 and the input unit 630.

The input unit 630 may be configured to receive input digit or character information, and generate keyboard, mouse, joystick, optical, or track ball signal input related to user setting and function control. Specifically, the input unit 630 may include a touch-sensitive surface 631 and another input device 632. The touch-sensitive surface 631, also referred to as a touchscreen or a touchpad, may collect a touch operation (such as an operation that a user performs on the touch-sensitive surface 631 or near the touch-sensitive surface 631 by using a finger, a stylus, or any other suitable object or accessory) of the user on or near the touch-sensitive surface 631, and drive a corresponding connection apparatus according to a preset program. Optionally, the touch-sensitive surface 631 may include two parts: a touch detection apparatus and a touch controller. The touch detection apparatus detects a touch direction of the user, detects a signal brought by a touch operation, and transfers the signal to the touch controller. The touch controller receives touch information from the touch detection apparatus, converts the touch information into coordinates of a touch point, sends the coordinates to the processor 680, and can receive and execute a command sent by the processor 680. In addition, the touch-sensitive surface 631 may be implemented by using a resistive, capacitive, infrared, or surface acoustic touch-sensitive surface. The input unit 630 may include the other input device 632 in addition to the touch panel 631. Specifically, the other input device 632 may include, but is not limited to, one or more of a physical keyboard, a function key (such as a volume control key or an on/off key), a trackball, a mouse, a joystick, and the like.

Figure 12:
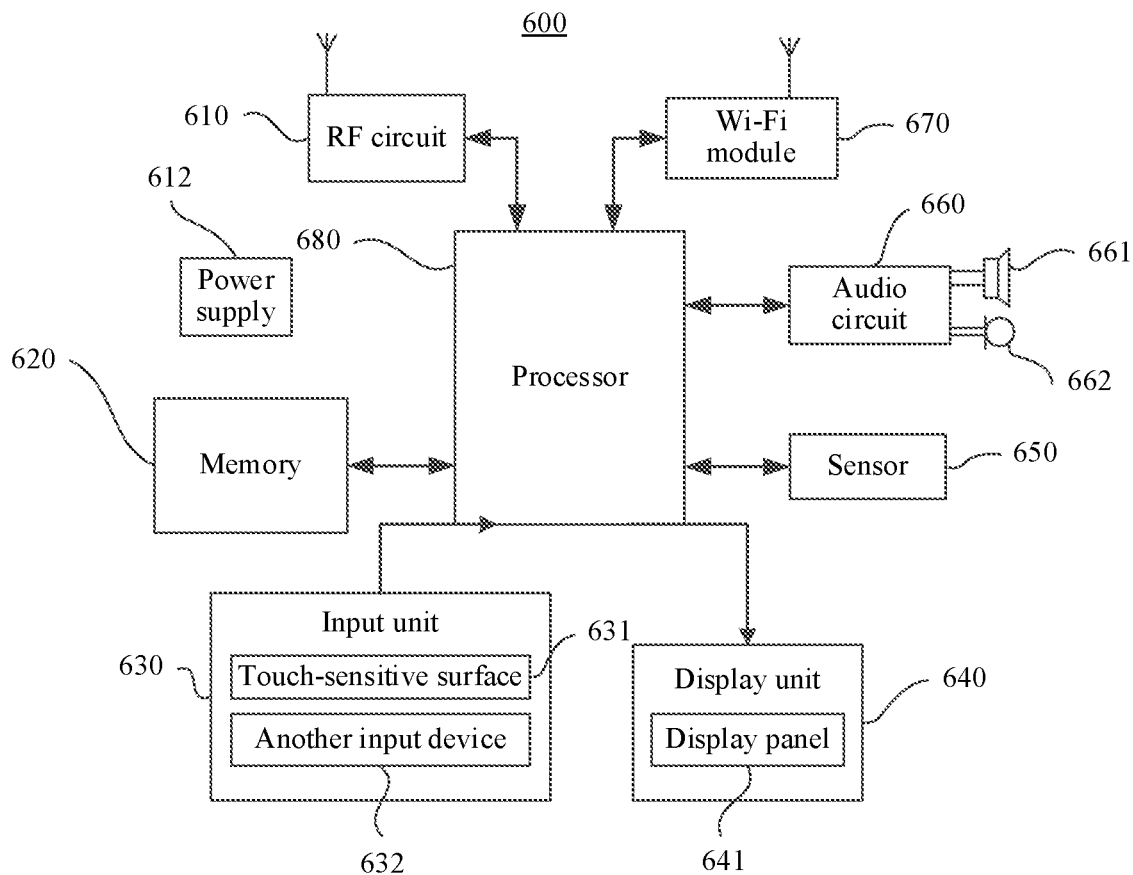
FIG. 12 is a schematic diagram of a terminal according to an embodiment of this application.

The display unit 640 may be configured to display information input by the user or information provided to the user, and various graphic user interfaces of the terminal 600 may include a graphic, a text, an icon, a video, and any combination thereof. The display unit 640 may include a display panel 641. Optionally, the display panel 641 may be configured in a form of an LCD (liquid crystal display), an OLED (organic light-emitting diode), or the like. Further, the touch-sensitive surface 631 may cover the display panel 641. When detecting the touch operation on or near the touch-sensitive surface 631, the touch-sensitive surface 631 transmits the touch operation to the processor 680 to determine a type of a touch event, and then the processor 680 provides a corresponding visual output on the display panel 641 based on the type of the touch event. In FIG. 12, the touch-sensitive surface 631 and the display panel 641 are used as two separate components to implement input and output functions. However, in some embodiments, the touch-sensitive surface 631 and the display panel 641 may be integrated to implement the input and output functions.

The terminal 600 may further include at least one sensor 650 such as a light sensor, a motion sensor, and another sensor. Specifically, the optical sensor may include an ambient light sensor and a proximity sensor. The ambient light sensor may adjust luminance of the display panel 641 based on the brightness of ambient light. The proximity sensor may turn off the display panel 641 and/or backlight when the terminal 600 approaches an ear. As one type of motion sensor, a gravity acceleration sensor may detect magnitude of accelerations in various directions (generally on three axes), may detect magnitude and a direction of the gravity when the gravity acceleration sensor is static, and may be applied to an application that recognizes a gesture of the terminal 600 (for example, switching between landscape orientation and portrait orientation, a related game, and magnetometer gesture calibration), a function related to vibration recognition (such as a pedometer and a knock), and the like. Other sensors such as a gyroscope, a barometer, a hygrometer, a thermometer, and an infrared sensor, that may be configured in the terminal 600, are not described in detail herein.

The audio circuit 660, a loudspeaker 661, and a microphone 662 may provide an audio interface between the user and the terminal 600. The audio circuit 660 may transmit, to the loudspeaker 661, an electrical signal that is obtained after conversion of received audio data, and the loudspeaker 661 converts the electrical signal into a sound signal and outputs the sound signal. In addition, the microphone 662 converts a collected sound signal into an electrical signal, the audio circuit 660 receives the electrical signal and converts the electrical signal into audio data, and outputs the audio data to the processor 680 for processing. The processor 680 sends the audio data to, for example, another terminal through the RF circuit 610, or outputs the audio data to the memory 620 for further processing. The audio circuit 660 may further include an earplug jack, to provide communication between a peripheral earphone and the terminal 600.

Wi-Fi is a short distance wireless transmission technology. The terminal 600 may help, by using the Wi-Fi module 670, a user receive and send an email, browse a web page, access streaming media, and so on. The Wi-Fi module 670 provides wireless broadband Internet access for the user. Although FIG. 12 shows the Wi-Fi module 670, it may be understood that the Wi-Fi module 670 is not a mandatory component of the terminal 600, and may be completely omitted based on a requirement without changing the essence of the present invention.

The processor 680 is a control center of the terminal 600, and connects all parts of the entire terminal 600 via various interfaces and lines. By running or executing the software program and/or the module stored in the memory 620 and invoking the data stored in the memory 620, the processor 680 performs various functions and/or data processing of the terminal 600, to perform overall monitoring on the terminal 600. Optionally, the processor 680 may include one or more processing cores. Optionally, the processor 680 may integrate an application processor and a modem processor. The application processor mainly implements the operating system, a user interface, the application program, and the like, and the modem processor mainly handles wireless communication. It may be understood that the modem processor may alternatively not be integrated into the processor 680.

The terminal 600 further includes the power supply 612 (for example, a battery) that supplies power to the components. The power supply may be logically connected to the processor 680 by using a power supply management system. In this way, functions such as management of charging, discharging, and power consumption are implemented by using the power supply management system. The power supply 612 may further include any component such as one or more direct current or alternating current power supplies, a recharging system, a power failure detection circuit, a power converter or an inverter, and a power status indicator.

Although not shown in the figure, the terminal 600 may further include a camera, a Bluetooth module, and the like, which are not further described herein. Specifically, in this embodiment, the display unit of the terminal may be a touchscreen display, and the terminal further includes the memory and one or more programs, where the one or more programs are stored in the memory and are executed by one or more processors after being configured. The one or more programs include an instruction used to perform the foregoing satellite location information transmission method.

Figure 13:
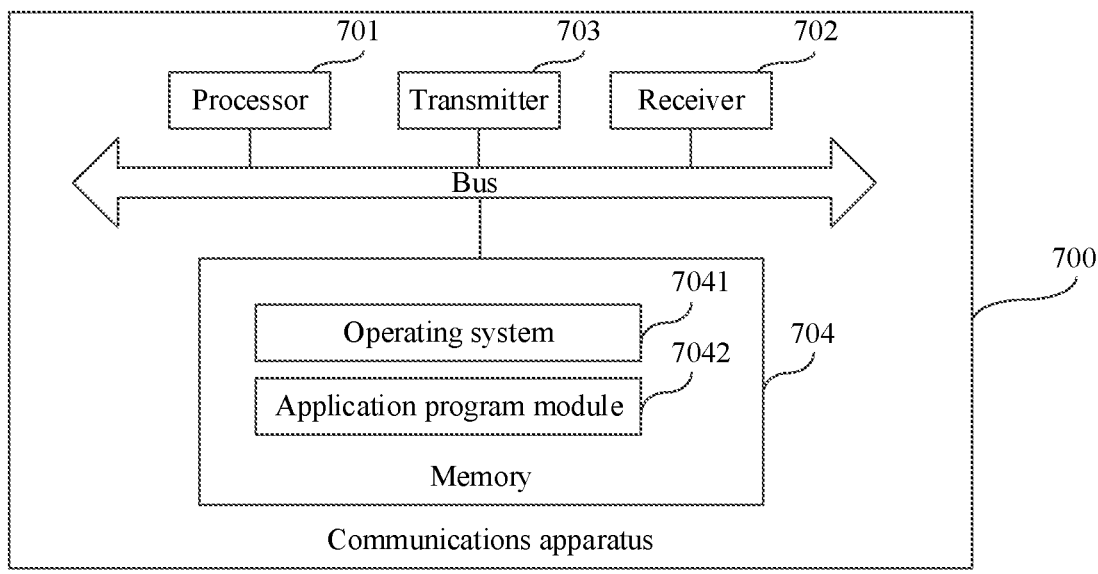
FIG. 13 is a schematic diagram of a satellite base station according to an embodiment of this application.

FIG. 13 is a block diagram of a communications apparatus 700 according to an example embodiment. The communications apparatus may be a satellite base station, or may be a structure such as a circuit structure, a chip, or a chip system in a satellite base station. As shown in FIG. 13, the communications apparatus 700 may include a processor 701, a receiver 702, a transmitter 703, and a memory 704. The receiver 702, the transmitter 703, and the memory 704 are separately connected to the processor 701 through a bus. It should be noted that in some possible implementations, the processor 701 and the memory 704 may be integrated together.

The processor 701 includes one or more processing cores. The processor 701 runs a software program and a module to perform the satellite location information transmission method provided in the embodiments of this application. The memory 704 may be configured to store a software program and a module. Specifically, the memory 704 may store an operating system 7041, and an application program module 7042 required for at least one function. The receiver 702 is configured to receive communication data sent by another device, and the transmitter 703 is configured to send communication data to the other device.

Figure 14:
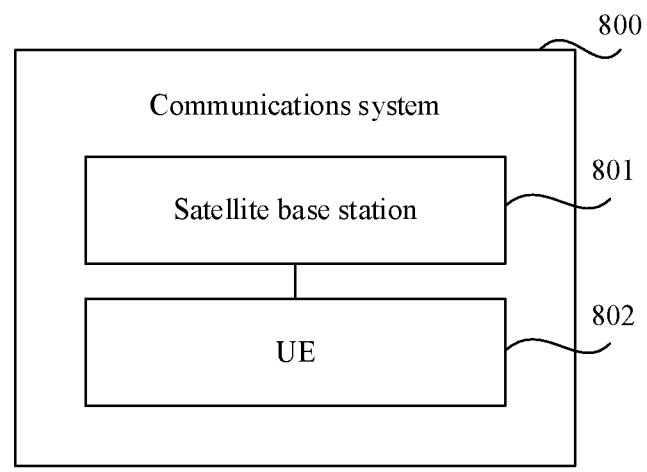
FIG. 14 is a schematic diagram of a communications system according to an embodiment of this application.

FIG. 14 is a block diagram of a communications system 800 according to an example embodiment. As shown in FIG. 14, the communications system 800 includes a satellite base station 801 and UE 802.

The satellite base station 801 is configured to perform the satellite location information transmission method performed by the satellite base station in the foregoing embodiments.

The UE 802 is configured to perform the satellite location information transmission method performed by the UE in the foregoing embodiments.

For example, the satellite base station 801 may include the satellite location information transmission apparatus 400 shown in FIG. 10, and the UE 802 may include the satellite location information transmission apparatus 500 shown in FIG. 11.

Alternatively, the satellite base station 801 may include the terminal 600 shown in FIG. 12, and the UE 802 may include the communications apparatus 700 shown in FIG. 13.

In an example embodiment, a computer-readable storage medium is further provided. The computer-readable storage medium is a nonvolatile computer-readable storage medium, and the computer-readable storage medium stores a computer program. When the stored computer program is executed by a processing component, the satellite location information transmission method provided in the foregoing embodiments of this application can be implemented.

An embodiment of this application further provides a computer program product. The computer program product stores an instruction. When the instruction is run on a computer, the computer is enabled to perform the satellite location information transmission method provided in the embodiments of this application.

An embodiment of this application further provides a chip. The chip includes a programmable logic circuit and/or a program instruction. When the chip runs, the satellite location information transmission method provided in the embodiments of this application can be performed.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

It should be understood that terms such as "first" and "second" in this specification are merely used for differentiation and description, but cannot be understood as an indication or implication of relative importance or an indication or implication of a sequence. Technical feature names with a same sequence number may correspond to different technical features.

A person of ordinary skill in the art may understand that all or some of the steps of the embodiments may be implemented by hardware or a program instructing related hardware. The program may be stored in a computer-readable storage medium, and the storage medium may include a read-only memory, a magnetic disk, a compact disc, or the like.

The foregoing descriptions are merely optional embodiments of this application, but are not used to limit this application. Any modification, equivalent replacement, or improvement made without departing from the spirit and principle of this application should fall within the protection scope of this application.

What is claimed is:

1. A satellite location information transmission method, wherein the method is used in user equipment (UE), and the method comprises:

receiving satellite location information from each of at least one satellite base station, wherein satellite location information sent by a satellite base station in the at least one satellite base station is used to indicate a location that is of the satellite base station and that is in a satellite orbit to which the satellite base station belongs, the satellite location information comprises satellite ranking information used to indicate a ranking of the satellite base station in a satellite movement direction of the satellite orbit, and the satellite base station is any of the at least one satellite base station;

determining a target satellite base station in the at least one satellite base station based on the received satellite location information; and initiating a random access process to the target satellite base station.

2. The method according to claim 1, wherein the satellite location information sent by the satellite base station comprises orbit information, where the orbit information is used to indicate the satellite orbit to which the satellite base station belongs.

3. The method according to claim 2, wherein the determining a target satellite base station in the at least one satellite base station based on the received satellite location information comprises:

when receiving satellite location information sent by only one satellite base station, determining the satellite base station that sends the satellite location information as the target satellite base station.

4. The method according to claim 2, wherein the determining a target satellite base station in the at least one satellite base station based on the received satellite location information comprises:

when receiving satellite location information sent by at least two satellite base stations, determining, in the at least two satellite base stations based on the received satellite location information, one satellite base station that satisfies a target condition, wherein the target condition comprises at least one of a longest duration for covering the UE and a shortest data transmission delay with the UE; and determining the satellite base station that satisfies the target condition as the target satellite base station.

5. The method according to claim 4, wherein the determining, in the at least two satellite base stations based on the received satellite location information, one satellite base station that satisfies a target condition comprises:

when satellite orbits indicated by orbit information in satellite location information sent by m satellite base stations in the at least two satellite base stations are the same, determining, in the m satellite base stations based on satellite ranking information in the satellite location information sent by the m satellite base stations, one satellite base station that satisfies the target condition, wherein m is an integer greater than 1; or when satellite orbits indicated by orbit information in the satellite location information sent by all of the at least two satellite base stations are different, determining, in the at least two satellite base stations based on the orbit information in the satellite location information sent by the at least two satellite base stations, one satellite base station that satisfies the target condition.

6. The method according to claim 5, wherein the determining, in the m satellite base stations based on satellite ranking information in the satellite location information sent by the m satellite base stations, one satellite base station that satisfies the target condition comprises:

when the target condition comprises the longest duration for covering the UE, determining, as the satellite base station that satisfies the target condition, one satellite base station that is in the m satellite base stations and that ranks the lowest in a satellite movement direction of the satellite orbit to which the m satellite base stations belong; or when the target condition comprises the shortest data transmission delay with the UE, determining, as the satellite base station that satisfies the target condition, one satellite base station that is in the m satellite base stations and that ranks in the middle in a satellite movement direction of the satellite orbit to which the m satellite base stations belong.

7. The method according to claim 5, wherein the orbit information is further used to indicate an altitude of the satellite orbit to which the satellite base station belongs; and the determining, in the at least two satellite base stations based on the orbit information in the satellite location information sent by the at least two satellite base stations, one satellite base station that satisfies the target condition comprises:

when the target condition comprises the longest duration for covering the UE, determining, as the satellite base station that satisfies the target condition, one satellite base station that is in the at least two satellite base stations and whose satellite orbit has a higher or highest altitude; or when the target condition comprises the shortest data transmission delay with the UE, determining, as the satellite base station that satisfies the target condition, one satellite base station that is in the at least two satellite base stations and whose satellite orbit has a lower or lowest altitude.

8. The method according to claim 1, wherein the satellite base station is located in a polar constellation, and the satellite orbit to which the satellite base station belongs is a geostationary earth orbit (GEO), a medium earth orbit (MEO), or a low earth orbit (LEO).

9. The method according to claim 1, wherein the receiving satellite location information sent by at least one satellite base station comprises:

receiving the satellite location information broadcast by the at least one satellite base station.

10. A satellite location information apparatus, comprising at least one processor and at least one memory, wherein the at least one memory stores an instructions; and the at least one processor, when executing the instruction, is configured to:

receive satellite location information from each of at least one satellite base station, wherein satellite location information sent by a satellite base station in the at least one satellite base station is used to indicate a location that is of the satellite base station and that is in a satellite orbit to which the satellite base station belongs, the satellite location information comprises satellite ranking information used to indicate a ranking of the satellite base station in a satellite movement direction of the satellite orbit, and the satellite base station is any of the at least one satellite base station;

determine a target satellite base station in the at least one satellite base station based on the received satellite location information; and initiate a random access process to the target satellite base station.

11. The apparatus according to claim 10, wherein the satellite location information sent by the satellite base station comprises orbit information, wherein the orbit information is used to indicate the satellite orbit to which the satellite base station belongs.

12. The apparatus according to claim 11, wherein the at least one processor is configured to:

when satellite location information sent by only one satellite base station is received, determine the satellite base station that sends the satellite location information as the target satellite base station.

13. The apparatus according to claim 11, wherein the at least one processor is configured to:
when satellite location information sent by at least two satellite base stations is received, determine, in the at least two satellite base stations based on the received satellite location information, one satellite base station that satisfies a target condition, wherein the target condition comprises at least one of a longest duration for covering the UE and a shortest data transmission delay with the UE, wherein
the at least one processor is further configured to determine the satellite base station that satisfies the target condition as the target satellite base station.

14. The apparatus according to claim 13, wherein the at least one processor is configured to:
when satellite orbits indicated by orbit information in satellite location information sent by m satellite base stations in the at least two satellite base stations are the same, determine, in the m satellite base stations based on satellite ranking information in the satellite location information sent by the m satellite base stations, one satellite base station that satisfies the target condition, wherein m is an integer greater than 1; or
when satellite orbits indicated by orbit information in the satellite location information sent by all of the at least two satellite base stations are different, determine, in the at least two satellite base stations based on the orbit information in the satellite location information sent by the at least two satellite base stations, one satellite base station that satisfies the target condition.

15. The apparatus according to claim 14, wherein
the at least one processor is configured to:
when the target condition comprises the longest duration for covering the UE, determine, as the satellite base station that satisfies the target condition, one satellite base station that is in the m satellite base stations and that ranks the lowest in a satellite movement direction of the satellite orbit to which the m satellite base stations belong; or
when the target condition comprises the shortest data transmission delay with the UE, determine, as the satellite base station that satisfies the target condition, one satellite base station that is in the m satellite base stations and that ranks in the middle in a satellite movement direction of the satellite orbit to which the m satellite base stations belong.

16. The apparatus according to claim 14, wherein the orbit information is further used to indicate an altitude of the satellite orbit to which the satellite base station belongs; and
the at least one processor is configured to:

when the target condition comprises the longest duration for covering the UE, determine, as the satellite base station that satisfies the target condition, one satellite base station that is in the at least two satellite base stations and whose satellite orbit has a higher or highest altitude; or
when the target condition comprises the shortest data transmission delay with the UE, determine, as the satellite base station that satisfies the target condition, one satellite base station that is in the at least two satellite base stations and whose satellite orbit has a lower or lowest altitude.

17. The apparatus according to claim 10, wherein the satellite base station is located in a polar constellation, and the satellite orbit to which the satellite base station belongs is a geostationary earth orbit (GEO), a medium earth orbit (MEO), or a low earth orbit (LEO).

18. The apparatus according to claim 10, wherein the at least one processor is configured to:
receive the satellite location information broadcast by the at least one satellite base station.

19. A non-transitory computer-readable storage medium, wherein the computer-readable storage medium stores an instruction, and when the instruction is run on an apparatus, the apparatus is enabled to:
receive satellite location information from each of at least one satellite base station, wherein satellite location information sent by a satellite base station in the at least one satellite base station is used to indicate a location that is of the satellite base station and that is in a satellite orbit to which the satellite base station belongs, the satellite location information comprises satellite ranking information used to indicate a ranking of the satellite base station in a satellite movement direction of the satellite orbit, and the satellite base station is any of the at least one satellite base station;
determine a target satellite base station in the at least one satellite base station based on the received satellite location information; and
initiate a random access process to the target satellite base station.

20. The non-transitory computer-readable storage medium according to claim 19, wherein the satellite location information sent by the satellite base station comprises orbit information, wherein the orbit information is used to indicate the satellite orbit to which the satellite base station belongs.

* * * * *

UNITED STATES PATENT AND TRADEMARK OFFICE
CERTIFICATE OF CORRECTION

PATENT NO. : 12,081,313 B2
APPLICATION NO. : 17/400765
DATED : September 3, 2024
INVENTOR(S) : Xueqiang Yan et al.

It is certified that error appears in the above-identified patent and that said Letters Patent is hereby corrected as shown below:

In the Claims

In Column 32, Line 38, in Claim 10, delete "instructions;" and insert -- instruction; --.

Signed and Sealed this
Fifth Day of November, 2024

Katherine Kelly Vidal
*Director of the United States Patent and Trademark Office*